(12) United States Patent  
Shimura et al.

(10) Patent No.: US 9,436,364 B2  
(45) Date of Patent: Sep. 6, 2016

(54) ENHANCED VIRTUAL SUCTION TOOL

(71) Applicant: Nintendo Co., Ltd., Kyoto (JP)

(72) Inventors: Yukimi Shimura, Redmond, WA (US);
Dean Russell, Redmond, WA (US);
Steven Petofalvi, Redmond, WA (US);
Brian McNeely, Redmond, WA (US);
Rory Johnston, Redmond, WA (US);
Yoonjoon Lee, Redmond, WA (US)

(73) Assignee: NINTENDO CO., LTD., Kyoto (JP)

( * ) Notice: Subject to any disclaimer, the term of this patent is extended or adjusted under 35 U.S.C. 154(b) by 148 days.

(21) Appl. No.: 14/463,937

(22) Filed: Aug. 20, 2014

(65) Prior Publication Data

US 2015/0058784 A1    Feb. 26, 2015

Related U.S. Application Data

(63) Continuation of application No. 13/160,342, filed on Jun. 14, 2011, now Pat. No. 8,823,733, which is a continuation-in-part of application No. 11/464,235, filed on Aug. 14, 2006, now Pat. No. 8,212,820.

(60) Provisional application No. 61/354,621, filed on Jun. 14, 2010, provisional application No. 60/746,390, filed on May 4, 2006.

(51) Int. Cl.
| | |
|---|---|
| *G06F 3/0484* | (2013.01) |
| *A63F 13/2145* | (2014.01) |
| *A63F 13/63* | (2014.01) |
| *G06F 3/0354* | (2013.01) |
| *G06F 3/0488* | (2013.01) |
| *G06T 19/20* | (2011.01) |
| *G06T 13/80* | (2011.01) |

(52) U.S. Cl.
CPC ....... *G06F 3/04842* (2013.01); *A63F 13/2145* (2014.09); *A63F 13/63* (2014.09); *G06F 3/03545* (2013.01); *G06F 3/0488* (2013.01); *G06T 13/80* (2013.01); *G06T 19/20* (2013.01); *A63F 2300/1075* (2013.01); *A63F 2300/301* (2013.01); *A63F 2300/6018* (2013.01); *G06F 2203/04807* (2013.01); *G06T 2219/2016* (2013.01)

(58) Field of Classification Search
None
See application file for complete search history.

(56) References Cited

U.S. PATENT DOCUMENTS

| 5,636,336 A | 6/1997 | Adachi |
| 2005/0245313 A1 | 11/2005 | Yoshino et al. |

OTHER PUBLICATIONS

"The Legend of Zelda Phantom Hourglass," for Nintendo DS, game (2007).

(Continued)

*Primary Examiner* — Maurice L McDowell, Jr.

(74) *Attorney, Agent, or Firm* — Nixon & Vanderhye P.C.

(57) ABSTRACT

A touch-based computer graphics user interface enhances a stylus pen with virtual suction to create a virtual vacuum or suction tool. The virtual tool may simulate a physical world suction tool and/or provide capabilities not available in the real world. The virtual suction tool allows the user to feel as if he or she has transcended the boundary between the virtual world and the real world by physically holding in his or her hand an object that is able to interact with and virtually attract and contain items (e.g., objects with characteristics and behaviors) removed from or expellable into the virtual world. The resulting highly intuitive user interface provides fun and exciting video game play and has other applications as well.

27 Claims, 21 Drawing Sheets

(56) References Cited

OTHER PUBLICATIONS

Instruction Booklets, "The Legend of Zelda Phantom Hourglass," Nintendo Wi-Fi Connection Instruction Booklet, "Nintendo DS, Health and Safety Precautions Booklet," "Register Your Software," and "If You Like the Legend of Zelda: Phantom Hourglass, check out these other great games." (2007).

"Luigi's Mansion," for Nintendo Gamecube, game (2001).

Instruction Booklets, "Luigi's Mansion," "Nintendo Gamecube Precautions Booklet" and "Don't be scared . . . Subscribe to Nintendo Power" (2001).

Bezerianos, Anastasia et al., "The Vacuum: Facilitating the Manipulation of Distant Objects," CHI2005, Apr. 2-7, 2005, Portland, Oregon, US, pp. 361-370.

Bryan, Jason et al., "Virtual Temporal Bone Dissection: A Case Study," Proceedings of the Conference on Visualization 2001, Ohio State University, pp. 497-598.

Kanev, Kamen, et al., "Design and Simulation of Interactive 3D Computer Games," Computer and Graphics, vol. 22 No. 2-3, printed in Great Britain, pp. 281-300 , 1998.

*Exemplary Illustrative Game Play Platform*

Exemplary Illustrative
Game Play Platform
Block Diagram

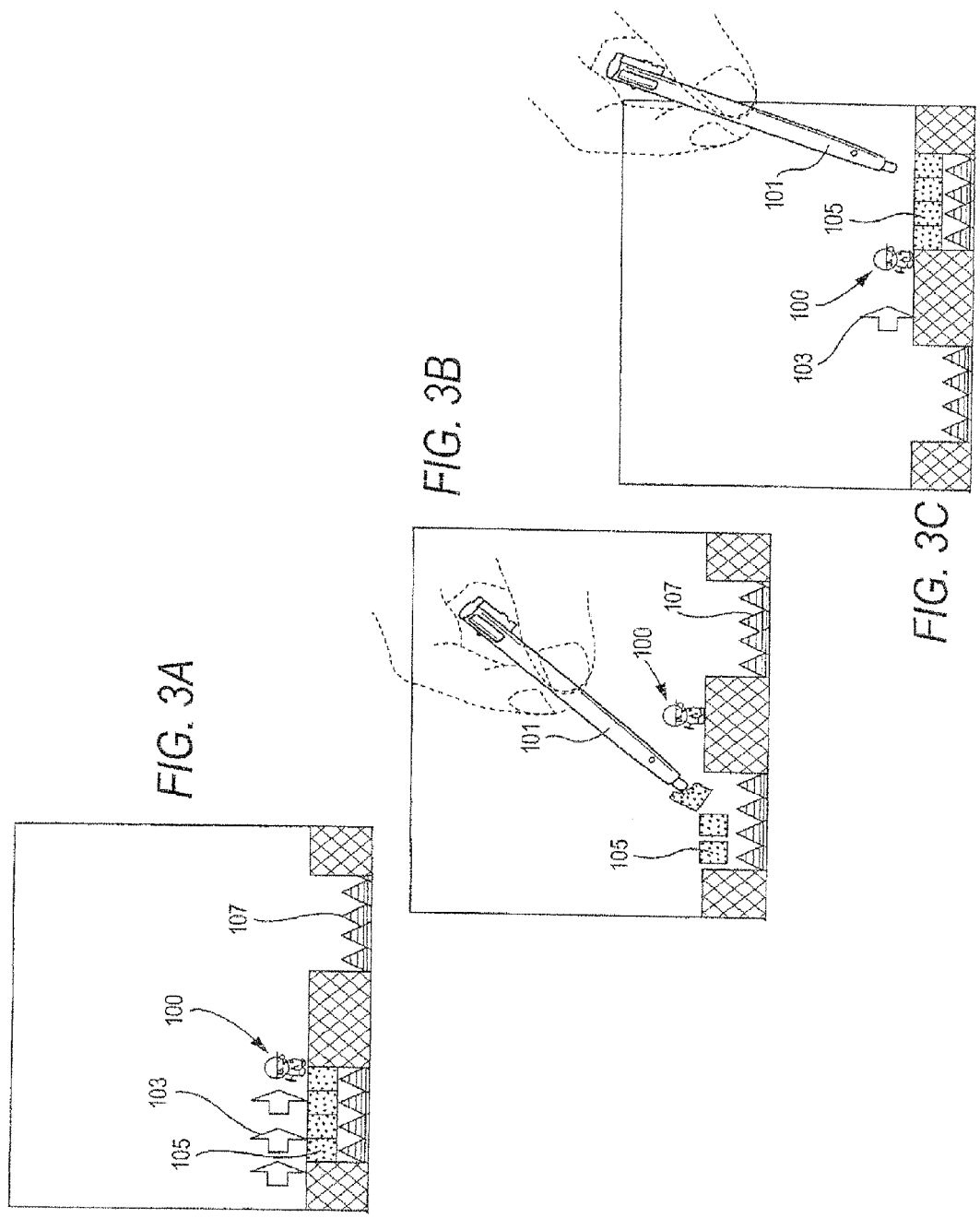

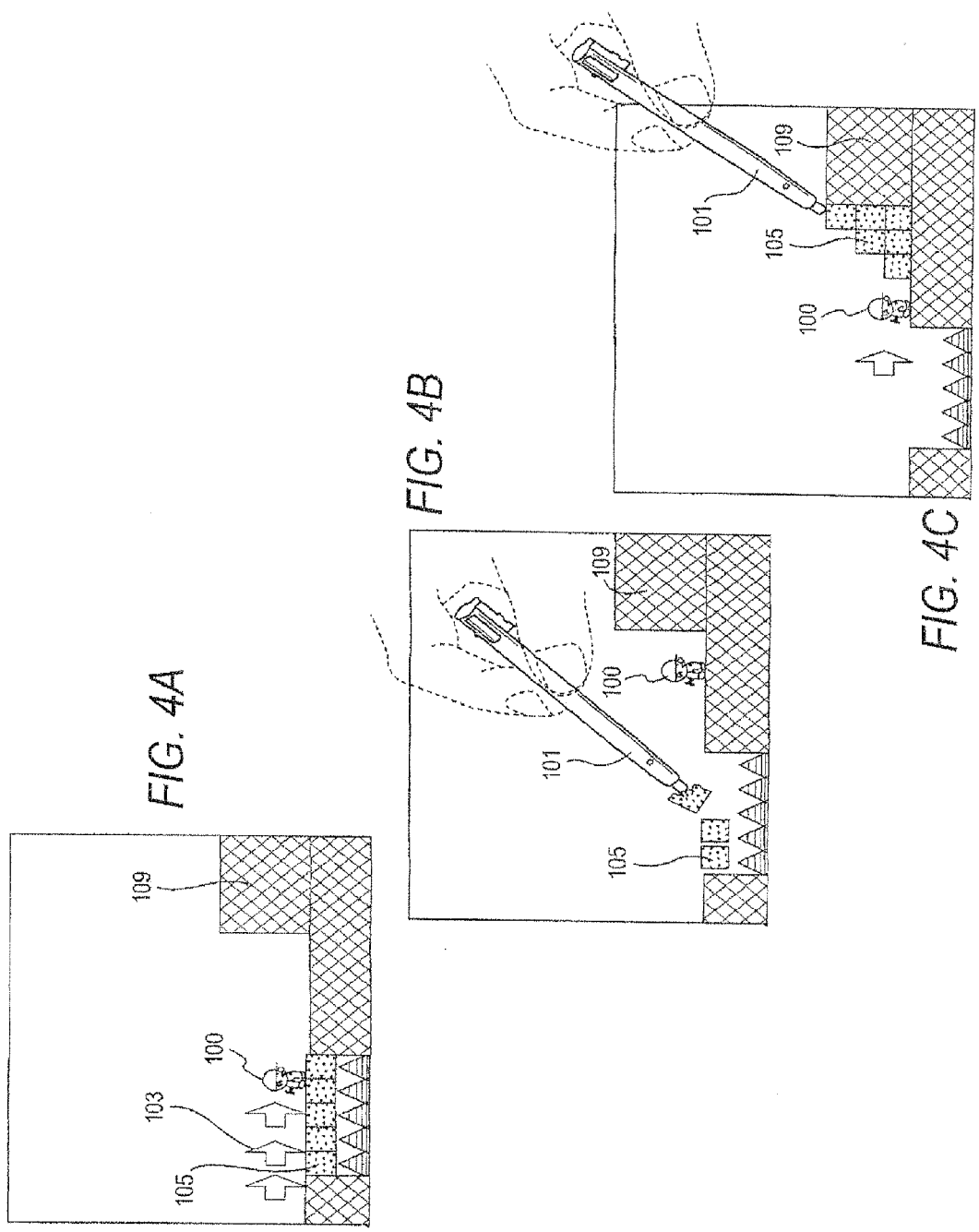

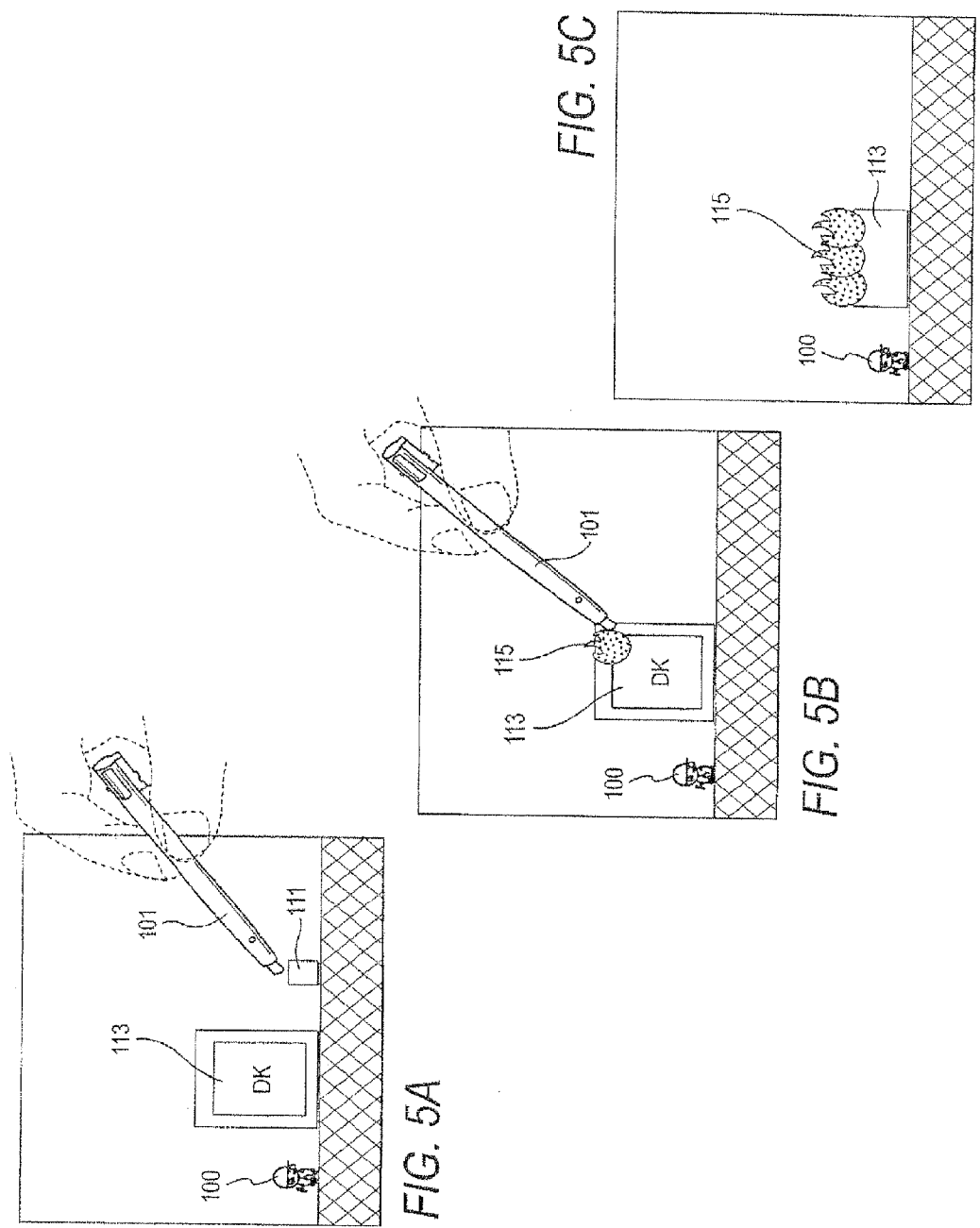

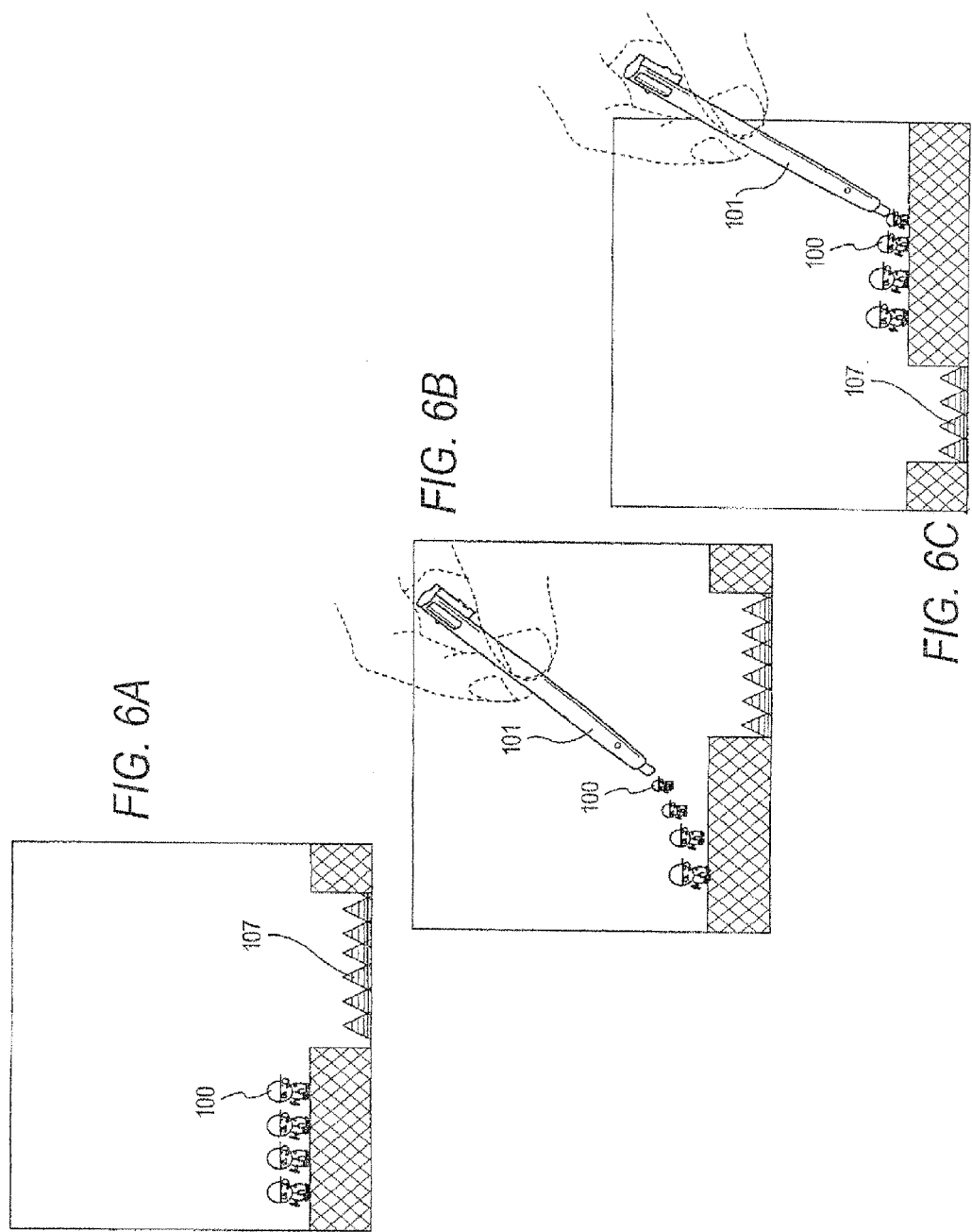

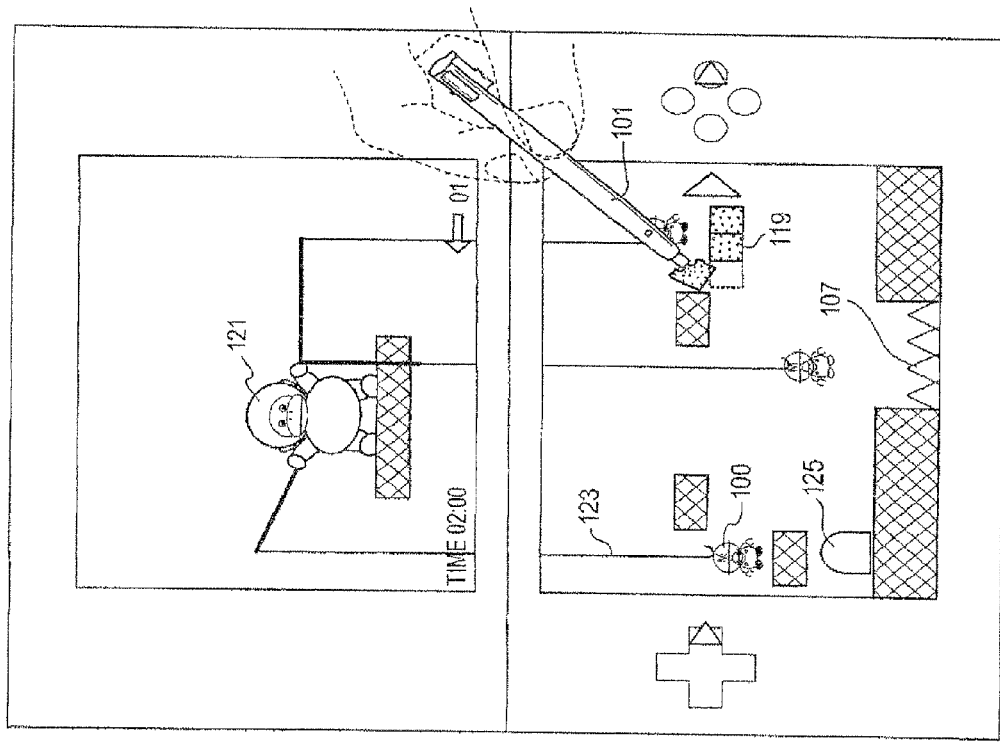

ENHANCED VIRTUAL SUCTION TOOL

CROSS-REFERENCE TO RELATED APPLICATIONS

This application is a continuation of U.S. patent application Ser. No. 13/160,342 filed Jun. 14, 2011; which claims the benefit of priority from U.S. Provisional Application No. 61/354,621 filed Jun. 14, 2010, and is a continuation-in-part of U.S. patent application Ser. No. 11/464,235 filed Aug. 14, 2006; which claims the benefit of priority from U.S. Provisional Application No. 60/746,390 filed on May 4, 2006. The disclosures of the prior applications are incorporated herein in their entirety by reference.

STATEMENT REGARDING FEDERALLY SPONSORED RESEARCH OR DEVELOPMENT

Not applicable.

FIELD

The technology herein relates to user interfaces for interacting with a computer and more specifically to graphical 3D user interfaces. Still more specifically, the technology herein relates to 3D computer displays and/or computer generated sound effects that enhance the apparent characteristics of a handheld object to provide virtual tool capabilities such as for example, suction, reverse suction and/or object containment.

BACKGROUND AND SUMMARY

Tools help us accomplish our daily tasks. A parent uses an electric or gas range, pots and pans, and spoons, spatulas and other implements to cook a meal for his or her family. A carpenter uses planes, saws, hammers and levels to cut pieces of wood to size and fasten them in. A mechanic uses wrenches, gear pullers, jacks, lifts and other tools to disassemble and reassembly a car engine. A gardener uses rakes, hoes, clippers and other implements to help nurture plants.

Just as in the real world, tools are also important in virtual realty, augmented reality and computer graphic simulations. Therefore, much work has been done in the past to develop efficient ways for a human user to control virtual tools displayed on a screen. In some cases, nearly the same controls a human user will operate in the real world can be used to control a computer graphics simulation of the same tool.

For example, an aircraft simulator used to train pilots often resembles nearly exactly a cockpit of an airplane. Large display screens are used to display what a pilot would see outside the window as if her or she were flying an actual airplane. The pilot in training operates the same controls found in a real cockpit to control the virtual aircraft simulation.

As another example, surgeons are sometimes trained using computer simulators that simulate the way the human body responds to surgical procedures. In such surgical simulations, a virtual scalpel may be used to cut tissue, a virtual suction device may be used to suction away blood and debris, and a virtual suture may be used to sew up the simulated wound. Such simulations allow surgeons to try new surgical techniques—oftentimes using real world controls that very closely resemble the implements they will use in the operating room—without risking the health and well being of actual human patients. Although there is no substitute for actual real world experience, such simulations can be useful as a first step toward training new surgeons.

Although designers of expensive aircraft, surgical and other simulators have the luxury of advanced, authentic controls and other input devices, designers of video game systems and other consumer based computer systems are often presented with a different set of challenges. For example, the conventional home video game platform, personal computer or handheld video game playing platform often has a relatively limited set of standard, general-purpose input devices the human player can use to manipulate video game action. Similarly, the computer keyboard and mouse of a conventional personal computer are generally used to control nearly all game functions of video games played on personal computers. Serious PC gamers will sometimes invest in a joystick peripheral device to allow more advanced directional control of certain games. However, such additional peripheral devices become impractical when gamers attempt to play games on portable platforms such as portable video gaming systems, cellular telephones with graphics capabilities, personal digital assistants, pocket PCs, and a host of other devices. In those contexts, the control interface that is available with the device out of the box is typically the one most players end up using for nearly all of their interactions. A challenge is to make maximum use of such input devices to create user-friendly, effective graphical user interfaces.

But while designers of video games, virtual and augmented reality based systems, and other virtual computer-generated environments may have certain limitations, they also have an additional degree of freedom. Just like in the real world, a character within a video game or other computer-generated environment may also use tools to accomplish certain virtual goals. But because computer generated environments are virtual, developers are not limited to real world tools. They can create new or fanciful tools not possible in the real world.

For example, the main character Link in Nintendo's highly successful Legend of Zelda video game series uses a sword, a musical instrument called an ocarina, a "windwaker" stick, a bow and arrow, a boomerang, a telescope, a fishing rod, and various other tools to accomplish certain results within the games. Some of these tools resemble real world objects, but within the game they often have magical properties. For example, Link can travel through time and otherwise magically manipulate his environment by playing certain songs on his ocarina.

Another interesting example is the "Poltergust 4000" vacuum cleaner strapped to the game character Luigi's back in Nintendo's renowned "Luigi's Mansion" video game. While this virtual vacuum cleaner has some resemblance to the kind of vacuum cleaner you clean your carpets with, it has amazing properties no real world vacuum cleaner would ever exhibit.

The human game player can operate Luigi's "Poltergust 4000" vacuum cleaner just like a real vacuum cleaner to "suck" (suction mode) or "blow" (exhaust mode). In the suction mode, the virtual vacuum cleaner sucks up objects within Luigi's virtual environment including but not limited to ghosts, fire spirits, water, ice cubes and balls. In the exhaust mode, the vacuum cleaner can exhaust some of these vacuumed-up items in fanciful ways. For example, if a fire spirit was the last item Luigi's vacuum cleaner sucked up, then operating Luigi's vacuum cleaner in the exhaust mode transforms the vacuum cleaner into a flame thrower. Similarly, if the last item the game player caused Luigi's vacuum player to suck up was water from a fountain, then Luigi's vacuum cleaner will in the exhaust mode act as a fire hose that emits a virtual water spray. This creative way of enhancing the functionality of an everyday appliance with magical or extraordinary properties has found great favor among millions of video game players throughout the world.

Despite the limitations in low cost video game and other consumer systems, there is an interesting relationship between the input devices the human game player uses to control a video game or other virtual environment, and the tools within the video game or other virtual environment used to accomplish objectives. In video games such as the Legend of Zelda and Luigi's Mansion, the human player uses buttons and/or joy sticks on a handheld controller (e.g., the "C stick") to control the operation of the tools the game characters use within the game. For example, in the Luigi's Mansion game, the human player can control whether Luigi's virtual "Poltergust 4000" vacuum cleaner is in the suction mode, the exhaust mode, a flashlight mode, or no mode by manipulating buttons and/or joysticks on the Nintendo GameCube handheld controller. The handheld controller functions as a control panel for Luigi's virtual vacuum cleaner, allowing the human video game player to control where the "Poltergeist 4000" vacuum cleaner is aiming and what mode it is operating in. The same joysticks and buttons would be used to control direction, acceleration, turning radius and other attributes of a vehicle in a driving or flight simulator game.

Video game and computer graphics designers are constantly searching for new and innovative ways to make interaction with virtual, simulated and augmented reality worlds more efficient, cost-effective and enjoyable. Recently, touch screen based user interfaces have been introduce in the context of video game systems, banking terminals and other computer devices as a way to interact more efficiently with a graphical-based computer system. However, further improvements are possible and desirable.

The technology herein uses a 3D graphical computer interface to enhance the function of a physical object used to interact with a video game, computer simulation or any other graphical presentation. The object a human user holds in his or her hands may be relatively static or non-electronic, and yet may—through interaction with a specialized user interface provided via a multimedia (e.g., audio and/or graphical video) display presentation—appear to possess enhanced functional characteristics and properties. An ordinary handheld object may, through interaction with a computer graphical interface, appear, for example, to take on extraordinary or even magical virtual tool characteristics.

In one specific exemplary illustrative non-limiting implementation, the stylus used to interact with a touch screen based video game interface may, through simulation of enhanced functions on a computer graphics screen, appear to take on characteristics of a virtual vacuum or suction tool. In this exemplary illustrative non-limiting implementation, the stylus itself may be a conventional elongated stick-like implement such as a piece of inert hard plastic. Such a stylus in one exemplary illustrative non-limiting implementation has no internal cavity, no electronics, and substantially no mechanical function other than to indicate touching positions on a touch pad or touch screen. An exemplary illustrative non-limiting implementation of the technology herein uses computer graphics and computer-generated sound to animate interaction with such a conventional stylus to provide suction and exhaust properties of a virtual suction tool.

For example, unlike a real suction tool which may have relatively limited ability to pick up and put down real world objects in terms of dimensions, object characteristics and the like, the virtual suction tool provided by one exemplary illustrative non-limiting implementation of the technology herein can have fanciful object manipulation capabilities such as infinite capacity to suck up objects of all sorts. In a puzzle game for example, the virtual suction tool may be able to suck up any number of bubbles, blocks or other objects within the game. As the human user moves the tip of the virtual suction tool over the objects, each object may disappear in a way that creates an impression that the stylus is sucking the object up into an internal cavity or reservoir within the stylus. For example, as the object is being virtually suctioned, portions of the object closest to the tool may deform on the screen to make it appear as if the object has been partially sucked into the virtual vacuum tool. Once the stylus virtually contains the entire object that has been sucked up, the object may disappear from the display.

In a further exemplary non-limiting illustrative implementation, a noise, such as a sucking or whooshing noise, may accompany each capture of an object, so that the player feels as if the stylus has actually sucked the object from the screen. Similarly, an exhaust sound can accompany virtual "exhaust" of an object back into the virtual environment. The human player hearing a computer-generated suction sound creates the impression that the virtual suction tool stylus or other object has sucked up the object and now "contains" the object. The stylus or other object may virtually "store" any number of digital objects, the capacity being limited only by the game design.

In example illustrative non-limiting implementations, the human player may move the stylus to a different position in the game and expel the same (or transformed) object(s) back into the game environment. Accompanying exhaust sounds and graphical effects that make it appear as if the stylus is actually expelling them into the game environment. Alternatively or in combination, the object may be transformed by the virtual suction device (e.g., a red block may be transformed into fire) in the process of being virtually exhausted or expelled into the game environment.

The technology herein is thus capable of transforming an everyday common physical object such as an inert stylus into a device that may but does not necessarily need to exist in the real world. Exemplary illustrative non-limiting implementations thus provide methods and apparatus for a player to cross the boundary between the virtual world and the real world. Through displayed virtual world images and sounds, the player gets the impression that a virtual object can be brought into and manipulated in the real world. He similarly has the feeling that the physical object he is holding in his hand has virtual tool properties, functions and/or characteristics defining the manner in which it interacts with the virtual world. For example, in the case of a stylus being used as a virtual suction tool, the player may see the object distort and shrink as it is "sucked into" the stylus—even though the stylus is incapable of applying suction in the real world, is not connected to a vacuum pump or vacuum reservoir, and has no internal reservoir or other capacity for containing objects or material.

Accompanied by a suction-like sound, the player is given the impression that the plastic stylus has actually pulled and captured an object from the virtual world, bringing it into his world. If the player decides to empty the contents of the virtual suction tool back into the virtual world, an animation of the object being expelled from the stylus accompanied by a distinctive "exhaust" sound gives the player the impression that the object (or a transformed version of the object) has been returned from the real world back into the virtual world.

Particularly advantageous exemplary illustrative non-limiting implementations make use of a touch screen to provide the boundary between the real world and the 3D virtual world. A stylus, finger or other object interacting with a touch screen provides a convenient way to indicate position in the virtual world where the interaction is to occur. The fact that the stylus, finger or other object is directly in contact with the touch screen allows virtual world graphics at the point of contact to appear to be interacting directly with the physical object. Such an "Alice Through the Looking Glass" property of the virtual suction tool is also highly intuitive and natural and easy to use.

Other alternative arrangements using other pointing or position indicating arrangements, with or without distance between the object and the display, can also be provided. Thus, the physical object in one exemplary illustrative non-limiting implementation can be a touch screen stylus, but the physical object can be any object capable of interacting with a 3D or other graphics or other display system including but not limited to remote control devices, specially designed objects that have physical appearance of tools or weapons, etc. Since the physical object used for interaction is given virtual or simulated characteristics, capabilities and/or functions, the resulting virtual tool can differ from and/or exceed functions, capabilities and/or characteristics of actual physical objects existing in the real world. For example, a virtual suction tool can have properties that differ from and/or exceed the properties of a real world suction tool. An inexpensive, inert or other piece of plastic or other material can serve as a variety of different tools for a variety of games, each tool resembling, simulating or exceeding the bounds of any real world equivalent. The types and functions of each virtual tool are limited only by the imagination of the game developer. Because the game player has direct control over the virtual objects and can manipulate them seemingly in the real world, the player gains a high degree of control and a very interesting and engaging gaming experience. In a gaming context, the player feels as if he is directly manipulating the game object and so has a close connection to the game experience.

Further enhancements include expanding the type and range of objects the virtual suction tool can operate upon. For example, in some exemplary implementations, it is possible for the virtual suction tool to be used to move a typically rigid object such as a pipe, a girder, a conveyor belt, a ladder, a spring, a cannon, a hillside or any other item. Such items can represent real world or imaginary objects, and can have functions, behaviors and characteristics. The virtual suction device can apply suction to any of these items and thereby remove them from the virtual game environment. Then, the virtual suction device can expel previously suctioned items back into the game environment within guides such as dotted rectangular rectangles or boxes. The items can be elongated, and the orientation of the items can change between removal and reinsertion. For example, if the original item was an elongated pipe that was oriented horizontally and the guide into which the item is later inserted is elongated and vertically oriented, the reinserted elongated pipe will take on a vertical as opposed to horizontal orientation. Similarly, the item when reinserted can have its form and size adapt to the form and size of the insertion guide box so that the reinserted item can be larger or smaller than the original item before removal and can even have a different shape or form.

In one exemplary illustrative non-limiting implementation, the virtual suction device can remove multiple types of items from the game environment and keep track of the sequence in which different items were removed to provide a first-in-first-out or last-in-last-out order of reinsertion relative to removal. Thus, if the virtual suction device removes a pipe section and then a spring, the user might expect that it will first expel a pipe and then a spring, or first a spring and then a pipe. Or in some modes, the virtual suction device can provide a shuffle function to randomize the order of items expelled relative to absorbed. Or in some implementations, the game environment will determine which of several items in the virtual suction device's store or stack of previously-absorbed items is an appropriate one to expel upon the user touching the virtual suction device stylus to the touch screen.

The virtual suction tool can thus be used to dynamically change the game environment during play of a puzzle or other game to move items around, thereby allowing the game character to traverse the environment from one point to another. For example, the game character can pass through one pipe section to get to a second pipe section. One the character has passed through into the section pipe section, the user can use the virtual suction device to absorb the first pipe section and move it to a third position on the other side of the second pipe section. In this way, the user can reuse the same pipe section multiple times by moving it from one place to another in the virtual game environment.

In one exemplary illustrative implementation, each type of item has a guide or an empty place in the game environment, and items can be moved only to visual empty slots decided or placed to accept them (e.g., empty version or a pipe or empty version of a spring). There may be for example only two springs in a level and 20 empty spring slots. Part of the puzzle is to use the virtual suction device to move the two springs from one slot to another to allow the game character to traverse the gamescape and reach an objective or goal by moving a limited number of items from one preplaced location to another.

In one exemplary illustrative implementation, it is possible to move a small item to a large placement location for the item. If the user expels the previously sucked up item into a larger slot, the expelled item will fill the space. This is because the illustrative implementation treats the moving items as objects having behaviors (e.g., cannon can shoot, springs can compress and expand to launch characters, etc.) and not merely as buckets of paint or liquid.

In this example, some of the various items can be hollow and provide inlets and exits. Some of the items can be split items to provide additional flexibility. For example, a character can enter one pipe section and exit a different, unconnected pipe section.

Such techniques can also be used to create custom levels using an in-game editor. Thus, users can create customized game levels by specifying not only which items go where but also which item preplacement destination slots go where. Thus, the user can create custom puzzle levels that require other users to move items from one preplacement slot to another using the virtual suction device. The user creating the custom level can use the virtual suction device to pretest the level to ensure it functions. This provides the user with more freedom to solve the puzzle from moving objects from one location to another.

BRIEF DESCRIPTION OF THE DRAWINGS

These and other features and advantages will be better and more completely understood by referring to the following detailed description of exemplary non-limiting illustrative embodiments in conjunction with the drawings of which:

FIG. 3A is an exemplary representation of a movable game character in a virtual gamespace encountering an obstacle;

FIG. 3B is an exemplary representation of a virtual suction tool interacting with digital objects in a virtual gamespace to remove objects from the virtual gamespace;

FIG. 3C is an exemplary representation of the virtual suction tool depositing previously removed digital objects into a virtual gamespace to aid a character in overcoming an obstacle;

FIG. 4A is another exemplary representation of a movable game character in a virtual gamespace encountering an obstacle;

FIG. 4B is another exemplary representation of a virtual suction tool interacting with digital objects in a virtual gamespace to remove objects from the virtual gamespace;

FIG. 4C is another exemplary representation of the virtual suction tool interacting with digital objects in a virtual gamespace to deposit previously removed objects into the virtual game space to build a structure that aids a movable character in overcoming an obstacle;

FIG. 5A is an exemplary representation of a movable game character in a virtual gamespace encountering an obstacle and a virtual suction tool interacting with a digital object in a virtual gamespace;

FIG. 5B is another exemplary representation of a virtual suction tool interacting with digital objects in a virtual gamespace to transform a removed object into a different form before expelling it back into the virtual gamespace;

FIG. 5C is an exemplary representation of the expelled transformed object interacting with the virtual gamespace;

FIG. 6A is an exemplary representation of a plurality of movable game characters in a virtual gamespace encountering an obstacle;

FIG. 6B is another exemplary representation of a virtual suction tool interacting with digital objects in a virtual gamespace to remove the game characters;

FIG. 6C is an exemplary representation of a virtual suction tool interacting with digital objects in a virtual gamespace in aiding a plurality of movable characters in overcoming an obstacle by depositing them back into the virtual gamespace at different positions, thereby providing a virtual transporter mechanism;

FIG. 8A is an exemplary representation of an enemy character having captured a plurality of movable characters in a virtual gamespace and a virtual suction tool interacting with a digital object;

DETAILED DESCRIPTION

Exemplary Virtual Suction Tool

Figure 1A:
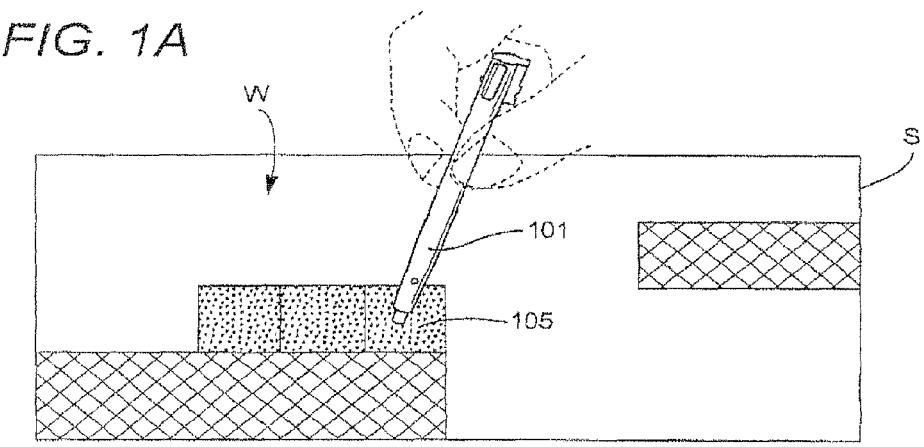
FIGS. 1A-1C are exemplary representations of an exemplary illustrative implementation of a virtual suction tool.
Figure 1B:
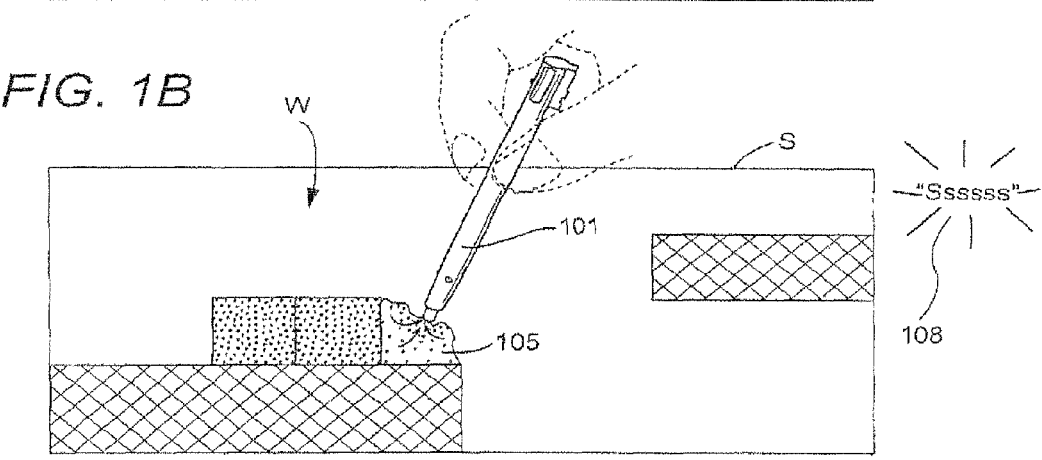
Figure 1C:
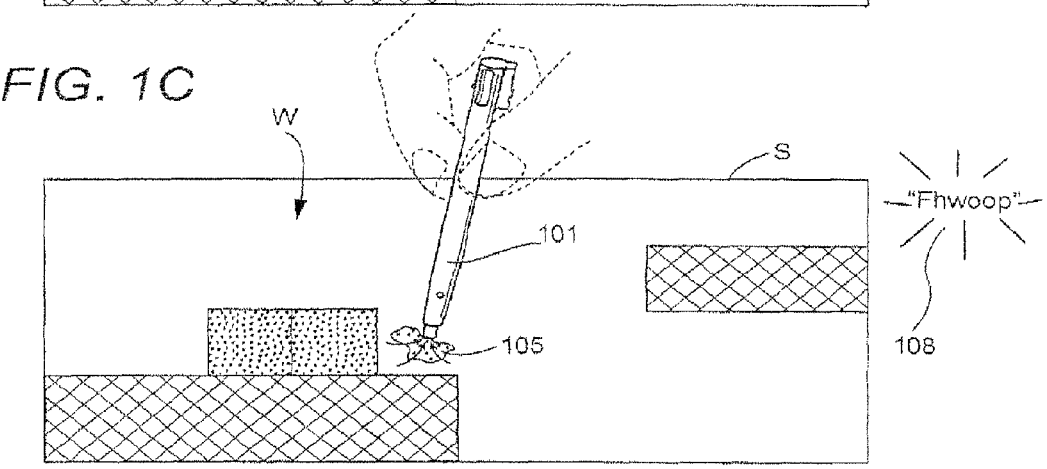

In one exemplary non-limiting illustrative implementation shown in FIGS. 1A-1C, a real world tool or object such as a stylus 101 is used to control game play on a gaming or computing device touch screen S. A function of stylus 101 in this particular example is to indicate positions on a touch screen S. However, in the exemplary illustrative non-limiting implementation, the stylus 101 appears to the user to have the property of being able to apply suction to the objects in the virtual 3D world depicted on screen S.

For example, as shown in FIG. 1a, the user uses stylus 101 to select an object 105 by pointing to it. When the user selects such an object, animation on screen S is used to make it appear that stylus 101 is pulling the selected object out of the virtual world across the screen boundary into the real world. In this example, the stylus 101 functions as a virtual suction device with storage. Unlike a real suction device, however, the exemplary illustrative non-limiting simulated virtual suction device may have properties which are impractical or impossible to duplicate in the real world. For example, the simulated device can suck up and hold solid objects within it, whereas in the real world objects that do not conform to the suction device tip might simply stick to a suction hole at the end of the tip. Because the player is interacting with the virtual world, the game designer can enhance the player's virtual tool with an array of capabilities that the player could not necessarily access in real life.

Once the player has selected the object 105 for manipulation (in this case by touching it with the end of the stylus), the stylus 101 begins to "suck" the object out of the virtual world and into the stylus 101. This realistic nature of this effect is heightened as the object 105 is animated to appear to begin to distort as it is "drawn into" the stylus as shown in FIG. 1b. The distortion could be slight visually perceptible perturbations, or it could be more radical distortion of the object as shown in FIG. 1b. The object 105 distorts in a way that one could imagine a real object would distort if pulled into a powerful suction hose. Additionally, to add to the effect, the game device may output a sound 106. This can be a hissing, suction-like sound 106 in the case of a vacuum, or can be altered to any appropriate sound.

As the block 105 is fully "drawn into" the stylus 101, it further distorts, as shown in FIG. 1C. Eventually, the block 105 disappears "into" the stylus 101, and the player will have the impression that the block 105 has left the virtual game world and is now trapped within the stylus 101 in the real world. The player will have the impression that the block 105 is now within the stylus 101 the player is holding in his or her hand. This final suction can be accompanied by a different noise 108, such as a popping sound as the object 105 "clears" the virtual suction tip. The game designer can tailor the noises according to the tool type. The closer the noises are to those that a similar "real" tool would make, the more the player feels like he is directly interacting with virtual objects using a real world suction tool.

Exemplary Video Game Platform

Figure 2A:
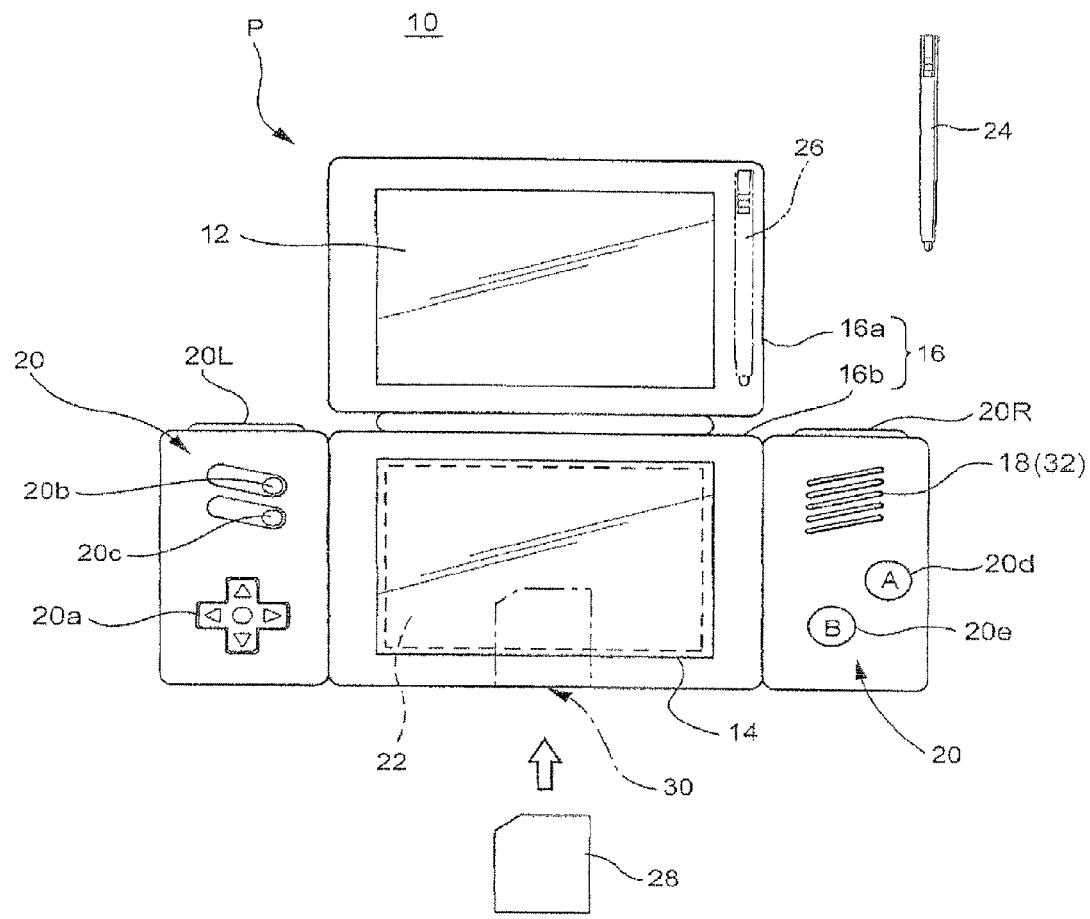
FIG. 2A is an exemplary external view of an exemplary illustrative non-limiting game apparatus for executing a game program providing virtual suction tool object control.

In FIG. 2A, an exemplary illustrative non-limiting game apparatus 1 that can be used for implementing the virtual suction tool technique described above. In one exemplary illustrative non-limiting implementation, system 10 may comprise a Nintendo DS portable handheld videogame system including a 3D graphics generator capable of generating complex texture-mapped displays of characters interacting with a 3D world from any desired viewpoint.

In the exemplary non-limiting illustrative implementation shown, game device 1 includes two liquid crystal displays (LCDs) 11 and 12, which are accommodated in a housing 18 so as to be located at predetermined positions. Specifically, in the case where the first liquid crystal display (hereinafter, referred to as the "LCD") 11 and the second LCD 12 are accommodated in a vertically stacking manner, the housing 18 includes a lower housing 18a and an upper housing 18b. The upper housing 18b is pivotably supported by a part of an upper surface of the lower housing 18a. The upper housing 18b has a planar shape slightly larger than a planar shape of the first LCD 11, and has an opening for exposing a display screen of the first LCD 11 on one main surface thereof. The lower housing 18a has a planar shape longer in the horizontal direction than the planar shape of the upper housing 18b, and has an opening for exposing a display screen of the second LCD 12 at approximately the center of the lower housing 18b in the horizontal direction. One of two side sections of the lower housing 18a interposing the second LCD 12 has speaker holes of a speaker 15, and each of the two side sections has an operation switch section 14.

The operation switch section 14 includes an operation switch (button A) 14a and an operation switch (button) 14b which are attached to one main surface of the side section of the lower housing 18a which is to the right of the second LCD 12 as seen in FIG. 2A. The operation switch section 14 also includes a direction indication switch (cross key) 14c, a start switch 14d, and a select switch 14e which are attached to one main surface of the side section of the lower housing 18a to the left of the second LCD 12 as seen in FIG. 2A. The lower housing 18a further includes side surface switches 14f and 14g, which are respectively provided on the upper surfaces of the side sections of the lower housing 18a to the left and to the right of the second LCD 12. When necessary, further operation switches may be provided, or unnecessary operation switches may be removed.

On an upper surface (the surface entirely shown in FIG. 2A) of the second LCD 12, a touch panel 13 (surrounded by the dashed line in FIG. 2A) is provided. The touch panel 13 is of, for example, any of a resistance film system, an optical (infrared) system, and a static capacitance coupling system. When a stylus 16 (or a finger) presses, moves on, or touches an upper surface of the touch panel 13, the coordinate position of the stylus 16 is detected and the coordinate data is output.

In the vicinity of a side surface of the upper housing 18b, an accommodation hole (an area represented by the two-dot chain line in FIG. 2A) is formed when necessary for accommodating the stylus 16 for operating the touch panel 13. In a part of one surface of the lower housing 18a, a cartridge insertion section (an area represented by the one-dot chain line in FIG. 2A) is formed, for detachably accepting a game cartridge 17 (hereinafter, referred to simply as the "cartridge 17") having a built-in memory (e.g., a ROM) which stores a game program. The cartridge 17 is a memory medium storing a game program, and is, for example, a nonvolatile semiconductor memory such as a ROM or a flash memory. A part of the lower housing 18b inner to the cartridge insertion section has a built-in connecter (see FIG. 2B) to be electrically connected with the cartridge 17. The lower housing 18a (or the upper housing 18b) accommodates an electronic circuit board having various electronic components such as a CPU and the like mounted thereon. The memory medium for storing the game program is not limited to the nonvolatile semiconductor memory, but may be a CD-ROM, a DVD, or a similar optical disc-shaped memory medium.

Figure 2B:
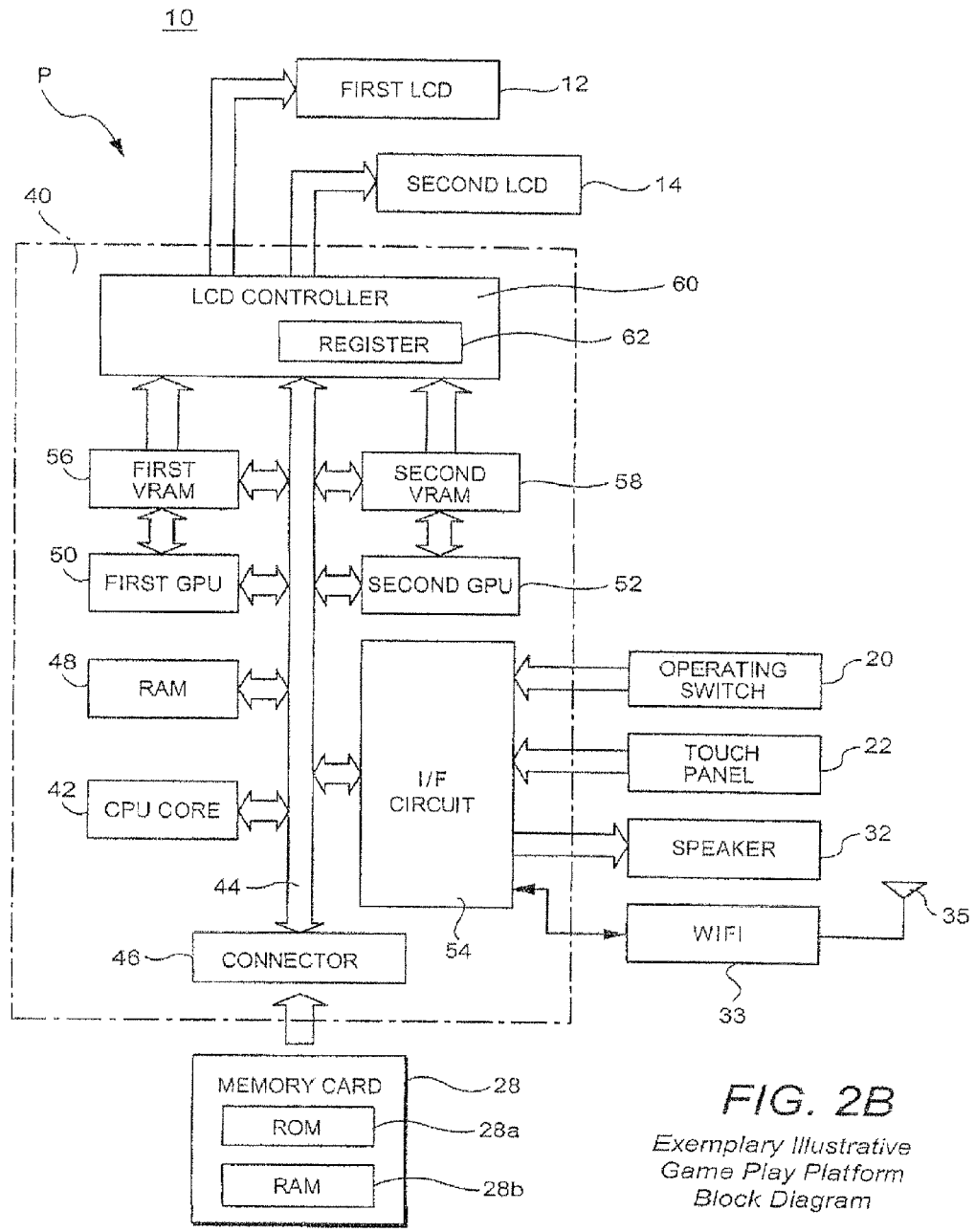
FIG. 2B is a block diagram showing an internal structure of the exemplary game apparatus.

Next, with reference to FIG. 2B, an internal structure of the game apparatus 1 will be described. FIG. 2B is a block diagram showing the internal structure of the game apparatus 1.

In FIG. 2B, an electronic circuit board accommodated in the housing 18 has a CPU core 21 mounted thereon. The CPU core 21 is connected to the connector 28, to be connected to the cartridge 17, via a predetermined bus, and the CPU core 21 is also connected to an input/output interface (I/F) circuit 27, a first graphic processing unit (first GPU) 24, a second graphic processing unit (second GPU) 26, and a working RAM (WRAM) 22.

To the connecter 28, the cartridge 17 is detachably connectable. As described above, the cartridge 17 is a memory medium for storing a game program. Specifically, the cartridge 17 has a ROM 171 storing the game program and a RAM 172 rewritably storing backup data mounted thereon. The game program stored in the ROM 171 in the cartridge 17 is loaded on the WRAM 22, and the game program loaded on the WRAM 22 is executed by the CPU core 21. Temporary data and data for generating an image which are obtained by the CPU core 21 through execution of the game program are stored in the WRAM 22.

As described above, the ROM 171 stores a game program, which is a group of instructions and a group of data in the format executable by the computer of the game apparatus 1, especially by the CPU core 21. The game program is read into and executed by the WRAM 22 when necessary. In this embodiment, the game program and the like are recorded in the cartridge 17, but the game program and the like may be supplied by another medium or via a communication network.

The I/F circuit 27 is connected to the touch panel 13, the operation switch section 14, and the speaker 15. The speaker 15 is located at a position just inside the speaker holes described above.

The first GPU 24 is connected to a first video RAM (hereinafter, referred to the "VRAM") 23, and the second GPU 26 is connected to a second VRAM 25. In accordance with an instruction from the CPU core 21, the first GPU 24 generates a first game image based on data for generating an image stored in the WRAM 22 and draws the first game image in the first VRAM 23. In accordance with an instruction from the CPU core 21, the second GPU 26 generates a second game image based on data for generating an image stored in the WRAM 22 and draws the second game image in the second VRAM 25.

The first GPU 24 is connected to the first LCD 11, and the second GPU 26 is connected to the second LCD 12. In accordance with an instruction from the CPU core 21, the first GPU 24 outputs the first game image drawn in the first VRAM 23 to the first LCD 11. The first LCD 11 displays the first game image which is output from the first GPU 24. In accordance with an instruction from the CPU core 21, the second GPU 26 outputs the second game image drawn in the second VRAM 25 to the second LCD 12. The second LCD 12 displays the second game image which is output from the second GPU 26.

The I/F circuit is a circuit for exchanging data between external input/output devices such as the touch panel 13, the operation switch section 14, the speaker 15 and the like, and the CPU core 21. The touch panel 13 (including a device driver for the touch panel 13) has a coordinate system corresponding to a coordinate system of the second VRAM 25, and outputs coordinate position data corresponding to the position which is input (indicated) by the stick 16 or the like. The resolution of the display screen of the second LCD 12 is, for example, 256 dots×192 dots, and the detection precision of the touch panel 13 is 256 dots×192 dots in correspondence with the resolution of the display screen of the second LCD 12. The precision detection of the touch panel 13 may be lower or higher than the resolution of the display screen of the second LCD 12.

Figure 2C:
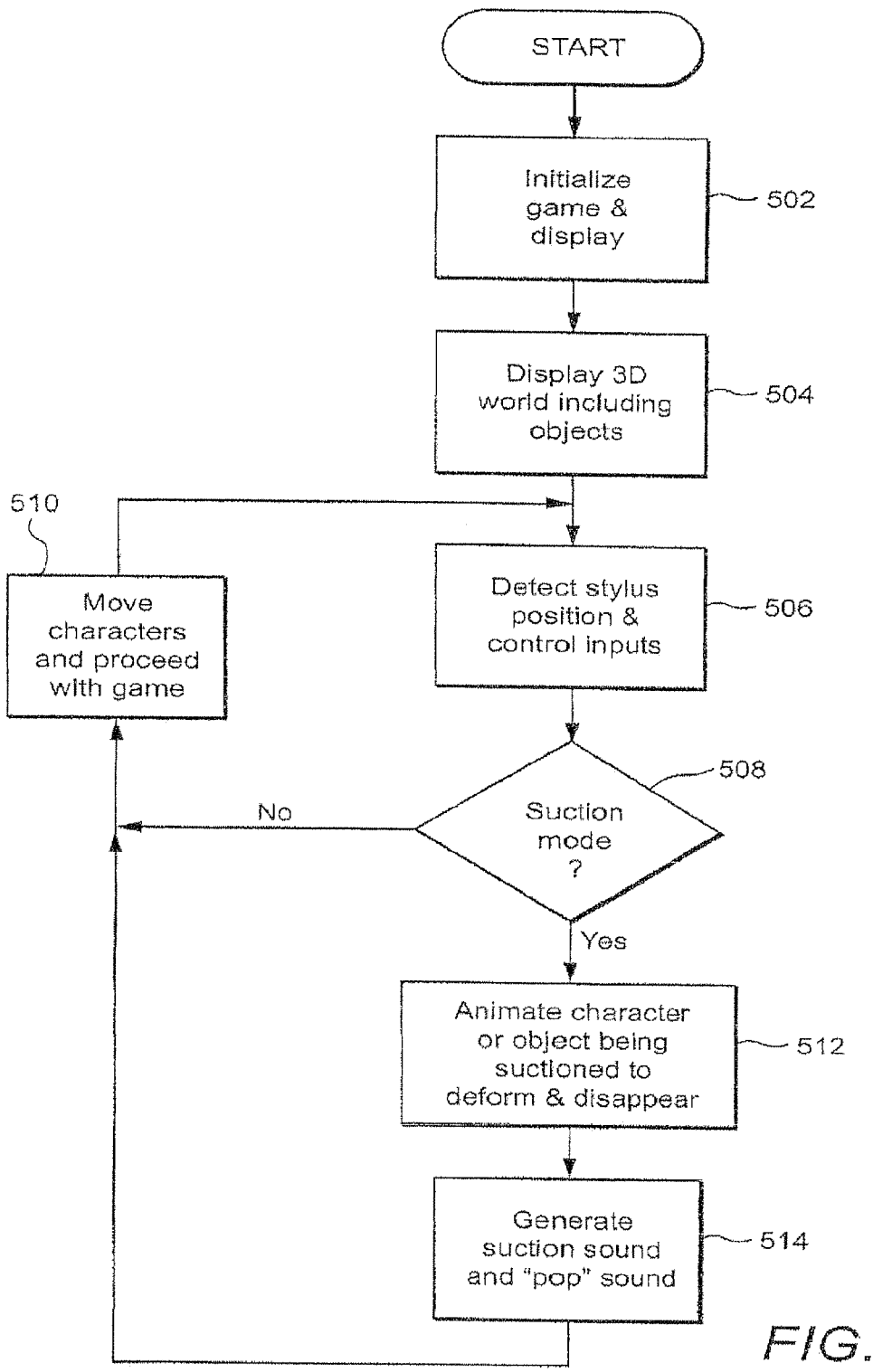
FIG. 2C is a flowchart of an exemplary illustrative non-limiting implementation of software-controlled virtual tool functionality.

FIG. 2C is a flowchart of an exemplary illustrative non-limiting implementation of software-controlled virtual tool functionality. In the example shown, software can be executed to control system 10 to perform a video game or other exemplary application. As described above, software may reside on a removable memory card 28 or other storage device insertable into system 10, or it may be provided to the system via other means (e.g., preloading into internal flash or other non-volatile memory, transmission over a wireless connection via WiFi functionality 33, or any other convenient means).

Referring to the exemplary FIG. 2C flowchart, upon starting a new game or other application, the software controls system 10 to initialize the game and display 12, 22 (block 502) and to then display a 3D world including objects (block 504). The software then controls system 10 to detect the position of stylus 24 on touch screen display 22 as well as the state of the various other control inputs 20 (block 506).

If, based upon the current game state, the other control inputs and the position of the stylus 24, the software determines that the stylus is to act as a virtual suction tool (decision block 508), then an exemplary illustrative non-limiting implementation, the software further controls system 10 to animate the character or other object directly beneath the position of stylus 24 to make it appear that the object is being drawn into the virtual suction tool stylus 24 (block 512). The object may thus deform in a manner that is based upon the relative position of the stylus 24 tip with respect to the object. Different objects may deform differently depending on the type of matter they represent (e.g., more solid objects may not deform at all but may simply be sucked into the virtual sucking tool stylus 24 in a non-deformed appearance, whereas other, more flexible objects may be deformed extensively under the effect of the virtual suction before disappearing from the screen display 22) (block 512).

At the same time, the software controls system 10 to generate a whooshing or suction sound that emanates from speaker 32 to create the illusion of virtual suction. When the object has animated under the illusion of suction force emanating from virtual suction tool stylus 24 finally disappears "into" the stylus, a "pop" or other suitable sound may emanate from speaker 32 to create the further illusion that the object has been sucked into the virtual suction tool stylus 24 (block 514). Game play may then proceed by other characters and/or objects (block 510). A similar action of blocks 508, 512, 514 may be used to control the virtual suction tool stylus 24 to apply reverse suction to expel objects into the virtual 3D world displayed on displays 12, 22.

The following describes particular non-limiting illustrative examples of how the virtual suction tool mechanism described above can be used in various game play scenarios. Example Use of Virtual Suction Device to Move Objects from One Position to Another—Virtual "Transporter" Tool In the exemplary non-limiting illustrative implementation shown in FIGS. 3A-3C, a game character 100 moving in a direction shown by arrows 103 encounters an obstacle 107 (in this case a chasm). The character 100 cannot cross the obstacle 107 if the gamespace is left as it is displayed in FIG. 3A. The character 100 has, however, just crossed over a series of movable digital objects, in this case blocks 105.

As shown in FIG. 3B, the player can use the virtual suction tool implemented by the stylus 101 to capture the blocks. Although the capture is virtual, the stylus 101 may appear to suck the blocks 105 off of the screen, and may be accompanied by a suitable sound effect as explained above. After the blocks 105 are no longer displayed on the screen, the player feels they are "stored" within the stylus 101 held by the player (in fact, the exemplary illustrative stylus 101 cannot store anything, and the virtual storage is being performed by a memory device that "remembers" what the virtual vacuum tool has suctioned up). Moving the stylus 101 can be used to move the "stored" blocks 105 around in the real world, so that they can be re-deployed in a new location in the virtual game world.

As shown in FIG. 3C, the player uses the stylus 101 to re-deploy the blocks 105 to build a bridge such that the obstacle 107 can be crossed by the character 100. Again, the stylus 101 may appear to inject the blocks 105 from the tip of the stylus 101, providing the illusion that the stylus 101 had actually been holding the blocks 105. The virtual suction tool may be placed into a "reverse suction" mode to expel the "retained" objects at desired positions with the virtual world. A suitable "exhaust" type sound effect may be played to aid in this illusion. The game character may now cross the bridge and proceed.

A game may determine whether a stylus should pick up or deploy a block in a variety of manners. In one exemplary non-limiting illustrative implementation, the stylus will pick up an object if it does not currently have any (or only a certain number of) objects in storage, and will deploy any objects it is currently storing. In this exemplary implementation, the stylus is made to resemble a suction tool with a finite capacity, such as a vacuum cleaner. In another exemplary non-limiting illustrative implementation the stylus will be operable to pick up or deploy objects at any time, and may use a FIFO or LIFO queue or a random or pseudo random order to redeploy objects. According to this exemplary implementation, the stylus has capabilities not found in any real world tool, namely the capacity for nearly infinite storage of potentially huge objects. In this exemplary implementation, if the stylus is touched to or encounters a point on the screen displaying a movable object, the stylus will capture that objects, and if the stylus is touched to or encounters a point on the screen where an object can be re-deployed, it will re-deploy the object in accordance with its deployment algorithm.

Additional controls 20 may be used to control the suction/reverse suction mode of the virtual suction tool, or on-screen controls can be detected, or strokes or gestures can be recognized to control virtual suction tool mode of operation. The stylus may also contain various types of objects and deploy appropriate types in appropriate spaces on the screen, such as only deploying characters if the deployment is selected over ground or only deploying blocks if the deployment is selected over a pit of spikes. The game space can be designed so that some objects are subject to suction effects and others are fixed and impervious to suction. Any suitable method for determining stylus capture/deployment strategy may be implemented.

Exemplary Use of Virtual Suction Tool to Construct Structures within the Virtual Environment In another exemplary non-limiting illustrative implementation shown in FIGS. 4A-4C, a character 100 encounters an obstacle 109 that is too tall for the character 100 to jump over or onto. Again, the character 100 has just crossed over a set of movable digital objects 105 in the direction indicated by the arrows 103.

As shown in FIG. 4B, the player can use the virtual suction tool of stylus 101 to capture the blocks 105. Once the blocks 105 are captured, the player can, as shown in FIG. 3C, re-deploy the blocks 105 in a step pattern using the stylus 101, and the character 100 can climb these steps to overcome the obstacle 109.

Exemplary Use of Virtual Suction Tool to Transform or Transmute Objects

FIG. 5A shows another non-limiting exemplary implementation in which a character 100 encounters a large crate-like object 113. There are no blocks available for stacking, but there is a single red block 111 (color not shown) on the screen which the player can capture with the stylus 101. This block 111 may be displayed in a different color than the stackable blocks 105 shown in FIGS. 2 and 3 to indicate its different properties.

After capturing the block 111, the player re-deploys the block 111 onto the obstacle 113 using the stylus. As shown in FIG. 5B, the virtual suction tool redeploys the block 111 it as a fire ball 115 instead of as a block. The flame 115 then burns away the obstacle 113 as shown in FIG. 5C. The virtual suction tool thus has the property in this example of transmuting a block into a fireball. Alternatively, the virtual suction tool of stylus 101 can be thought of as turning into a match, torch of other fire lighting tool after it has sucked up or ingested a red block 111.

Example Use of Virtual Suction Tool to Transport or Rescue Characters

Many of us have watched Star Trek scenes where a character in trouble can radio to be "beamed up" and transported away from trouble. A similar effect can be provided using the virtual suction device stylus 101. In a further exemplary non-limiting illustrative implementation shown in FIG. 6A, a plurality of characters 100 encounters an obstacle 107. There are no blocks for the player to manipulate in this instance so the situation appears hopeless.

Instead of manipulating blocks, the characters 100 become movable digital objects and the player captures them with the stylus 101 as shown in FIG. 6B. FIG. 6C shows the player using the stylus 101 to re-deploy the characters 100 safely on the other side of the obstacle 107. Now the player has actually drawn the game characters out of the game and "brought" them into the real world temporarily. The stylus 101 acts somewhat like a virtual transporter tool in Star Trek. The player can replace the game characters back into the virtual world when a safe area is found.

Exemplary Use of Virtual Suction Tool to Remove Objects at Appropriate Timings

Figure 7C:
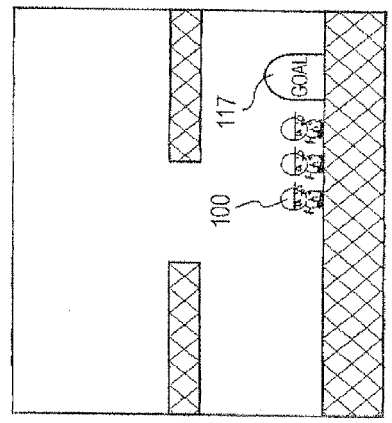
FIG. 7C is an exemplary representation showing how game characters can achieve their goal.
Figure 7B:
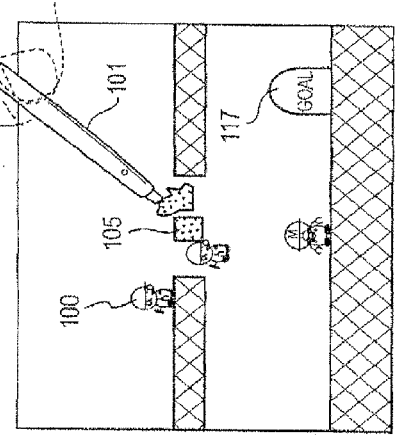
FIG. 7B is another exemplary representation of a virtual suction tool interacting with digital objects in a virtual gamespace to remove obstacles thereby allowing game characters to proceed.
Figure 7A:
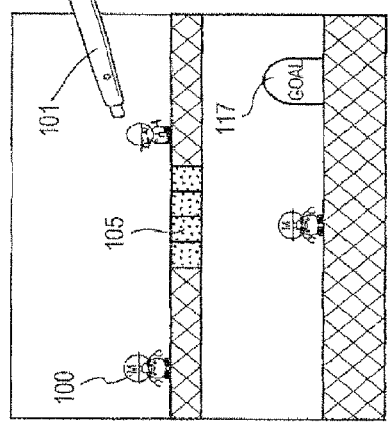
FIG. 7A is another exemplary representation of a plurality of movable game characters in a virtual gamespace encountering an obstacle.

In an additional exemplary non-limiting illustrative implementation shown in FIG. 7A, a plurality of characters 100 are prevented from reaching a goal 117 by a series of movable digital objects 105.

In FIG. 7B, the virtual suction tool stylus 101 is shown capturing the digital objects 105, allowing the characters 100 to fall through the resulting gap at just the right time. The characters 100 can now all reach the goal 117. The virtual suction tool stylus 101 has thus permanently removed objects from the virtual gamespace. In this case, the stylus 101 is used to activate a first character in FIG. 7A. The first character activates the second character, and the virtual suction tool stylus 101 sucks up blocks when the first character arrives right above the third character. The third character is activated automatically, and all three characters proceed to the goal (chain reaction).

Exemplary Use of Virtual Tool to Suction Objects and Transform them into Additional Animated Tools for Injection into the Virtual Environment FIG. 8A shows a further exemplary non-limiting illustrative implementation in which an enemy 121 has captured a plurality of characters 100 with fishing lines 123. A series of movable digital objects 119 are also shown. The objects may be of a certain color or appearance to indicate a particular property. The player can capture these objects using the stylus 101 operating as a virtual suction tool.

Figure 8B:
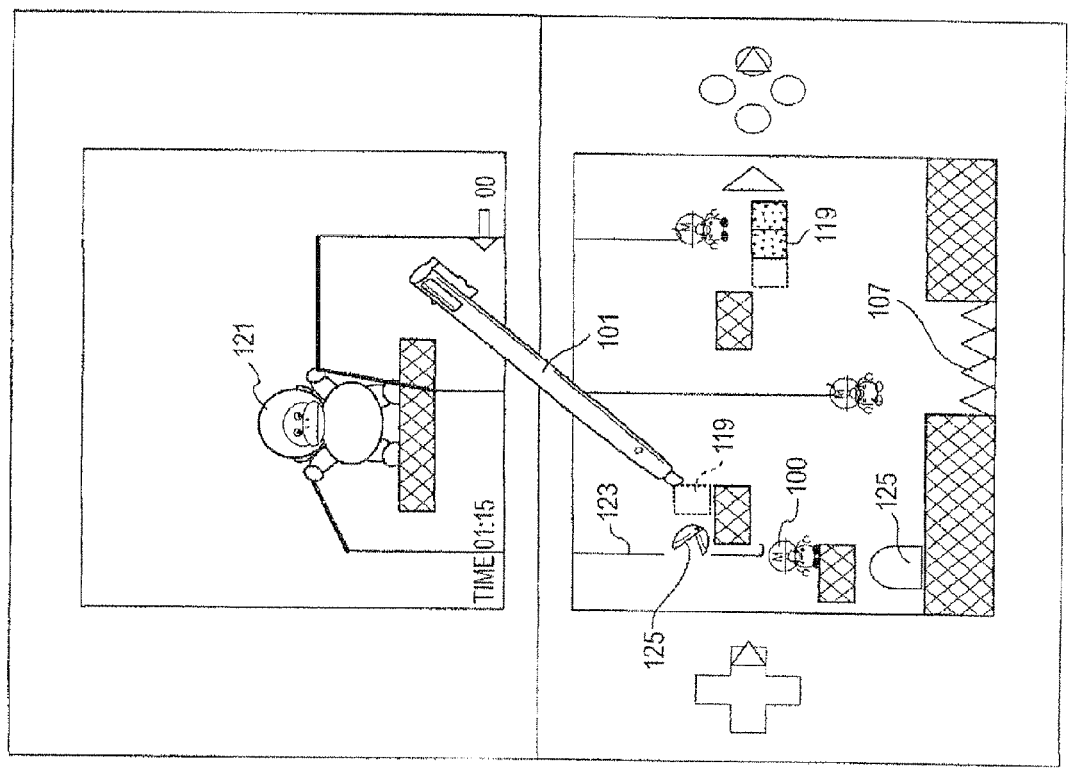
FIG. 8B is an exemplary representation of a virtual suction tool interacting with digital objects in a virtual gamespace in aiding a plurality of movable characters to escape capture.

FIG. 8B shows the player re-deploying a captured digital object 119 using the stylus 101 virtual suction tool in the exhaust mode. The object 119 is transformed during deployment into a moving cutter 125 that cuts the line 123. One of the plurality of characters 100 is now free from the line. During this operation, the player has to think about the position and timing of the cutter 125. The game character is destroyed if he is dropped on a hazard or falls from a very high position. The player also pays attention to which block is taken. For example, if all of the blocks are sucked up into the virtual suction tool, there will be no platform for the game character to land on.

Example Use of Virtual Suction Tool to Move Objects to Catch Other Objects

Figure 9:
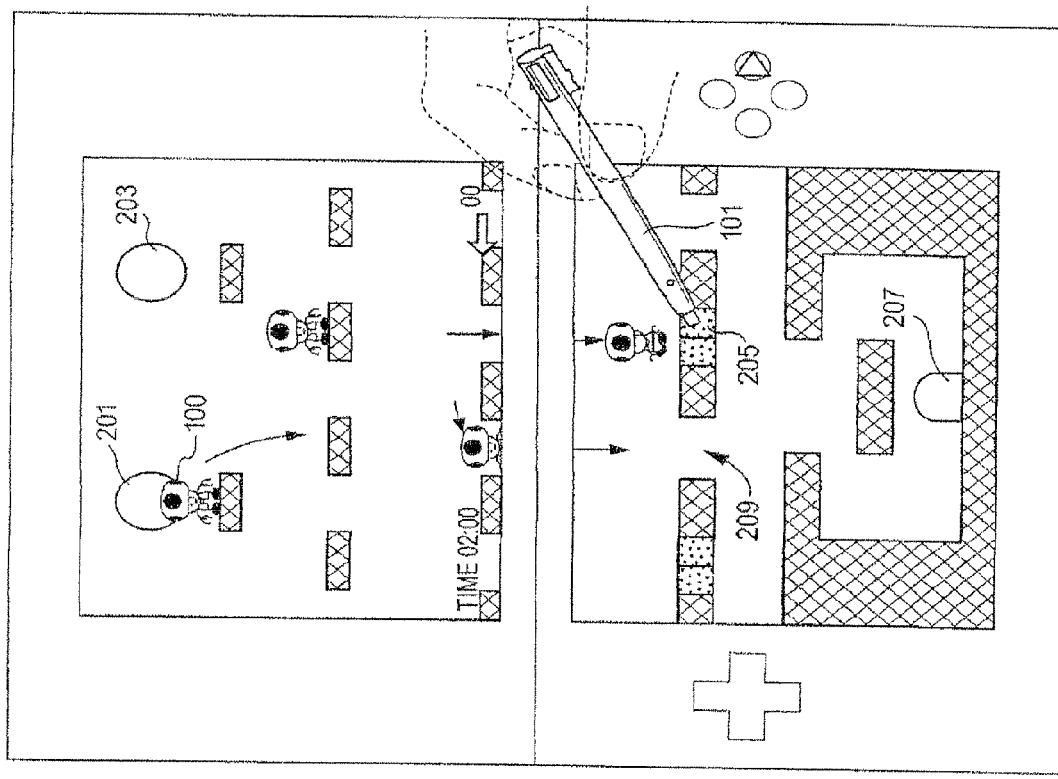
FIG. 9 is an exemplary representation of a plurality of movable characters appearing in a virtual gamespace and a virtual suction tool interacting with digital objects to aid the characters in reaching a goal.

FIG. 9 shows another exemplary non-limiting illustrative implementation. In this implementation, a plurality of characters 200 are falling from holes 201. The characters 200 are moving towards a goal 207, but long falls through gaps such as a gap 209 will cause the character 200 to die. The player can use the virtual suction tool stylus 101 to draw the movable objects 205 to different parts of the virtual world to ensure that the characters 200 all make it to the goal 207 without falling too far. In the top of FIG. 9, a game character drops from the upper screen one after another. The virtual suction tool stylus 101 is used to move blocks to catch the game character. If timing of movement is not right, the game character may drop into a pot hole and break.

Virtual Suction Tool with Visual Indicator

Figure 10C:
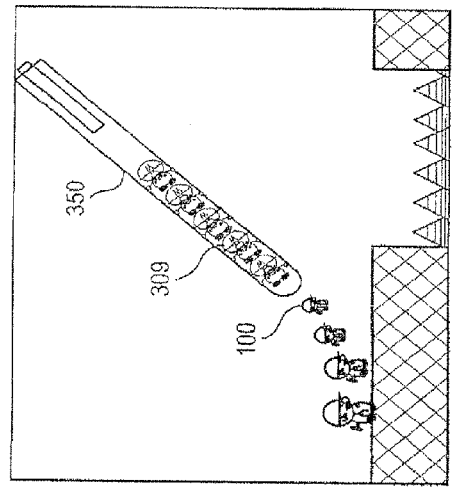
FIGS. 10B, 10C and 10D are exemplary illustrative non-limiting implementations of the virtual suction tools with exemplary non-limiting containment indicators interacting with digital objects in a virtual gamespace.
Figure 10D:
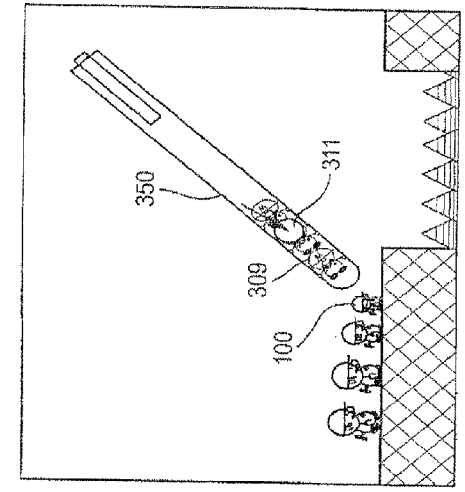
Figure 10A:
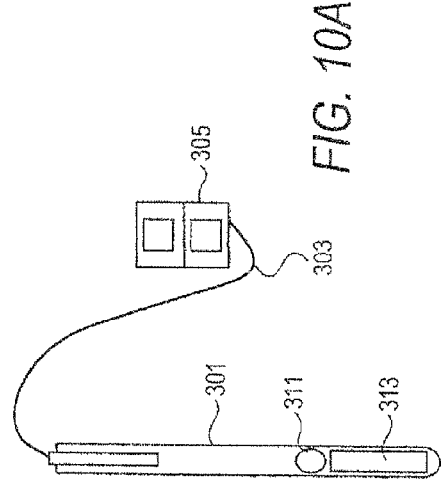
FIG. 10A is an exemplary representation of a virtual suction tool having a containment indicator.

FIG. 10A shows an exemplary non-limiting illustrative implementation of a stylus 301 adapted for digital object capture. The stylus 301 may be provided with a button 311 and a digital display 313 or some other suitable method for representing stylus contents and capacity. The virtual suction tool stylus 301 sucks up blocks and the player can see visually the number and color of the blocks "inside" the pen.

The stylus 301 may be attached to a device hook-up 305 by a cable 303. Alternatively, the stylus 301 may connect wirelessly to the device hook-up 305, and could be powered by internal batteries, solar cells, etc. The display or indicator incorporated into stylus 301 may be an array of light emitting diodes, a linear or elongated color or monochrome liquid crystal display, a thermo-sensitive display, or any other type of display. The display can indicate number of "contained" objects and/or characteristics of the contained objects (e.g., color, size, etc.).

Figure 10B:
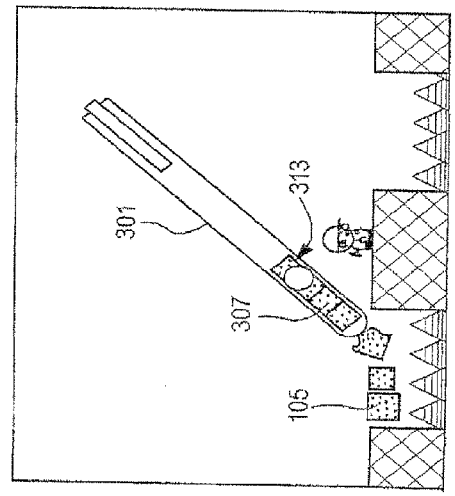

FIG. 10B is an exemplary non-limiting illustrative implementation of the adapted stylus 301 capturing digital objects 105. The objects are displayed as virtually captured 307 in the stylus 301 by the display 313. A thermometer type virtual level indicator is employed to indicate to the user how "full" the virtual suction tool is. Virtual suction may cease if the virtual suction tool indicator indicates the tool is completely "full."

FIG. 10C shows another exemplary non-limiting illustrative implementation of a further adapted stylus 350. This stylus 350 has been adapted to work with a particular game and actually show digital images 309 of various digital objects 100 that have been captured. An LCD or display or other suitable methods of displaying contents and capacity of the stylus may be used to display images of the captured objects so the player can see which objects he has captured and which objects will be expelled next and in which order. This provides the player with a better visual inventory of the objects contained within the stylus 350, and creates a highly visual sense that the virtual suction tool has indeed captured the suctioned objects. Each time the virtual tool sucks up an object, it is displayed at the bottom of the display closet to the tip and all the other objects move up in the display to make it appear that they have been displayed. The resulting display thus appears to the player to be a window into an object reservoir within the virtual suction tool—much as an eye dropper allows you to see how much liquid you have suctioned into the eye dropper's tube. Any number of suitable adaptations may be made to this stylus to make it more generic in display or more game specific.

FIG. 10D shows a further exemplary non-limiting illustrative implementation of the stylus 350 re-deploying captured objects 100. The volume of captured objects displayed 309 decreases as the objects 100 are released to the screen. The button 311 may be depressed to indicated deployment rather than capture. The button 311 can be depressed to expel an item or character "within" the stylus 301. If the player wants to replace items in the pen rapidly, he/she can hold the button and sweep the screen so that multiple items will be deployed or "sprayed" onto the screen.

If the player likes precise control, he/she can stamp items one by one by tapping the screen.

Figure 11B:
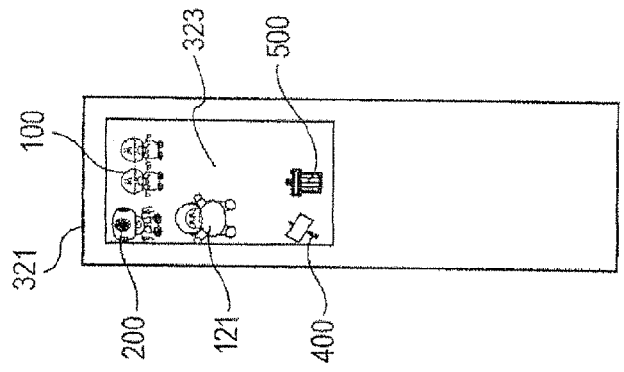
FIGS. 11A and 11B are an exemplary representation of another exemplary illustrative non-limiting virtual suction tool arrangement interacting with digital objects in a virtual gamespace.
Figure 11A:
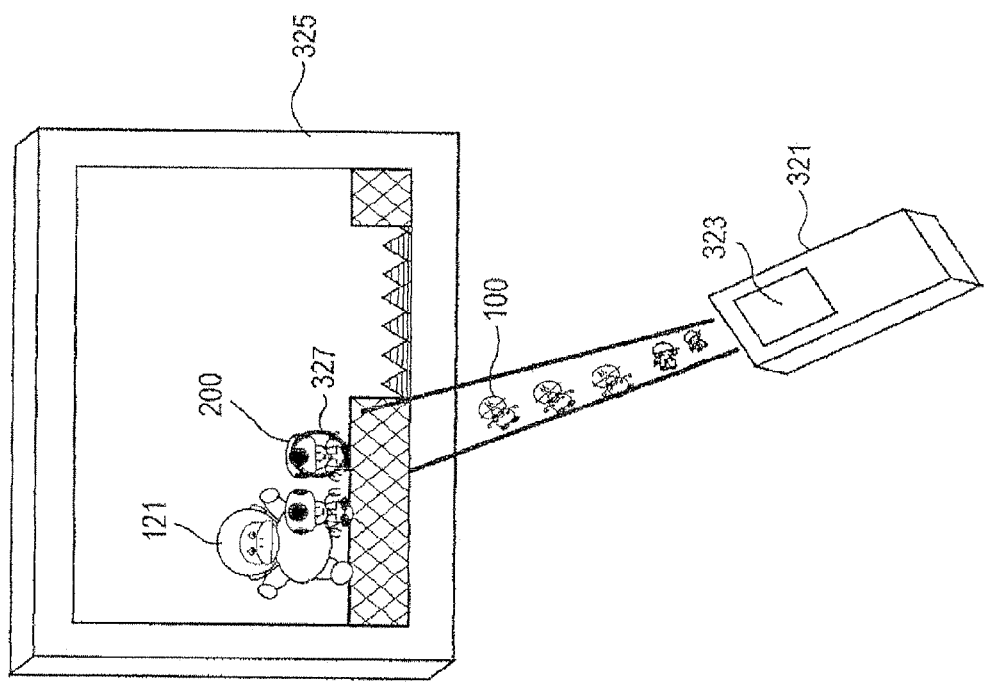
Figure 12:
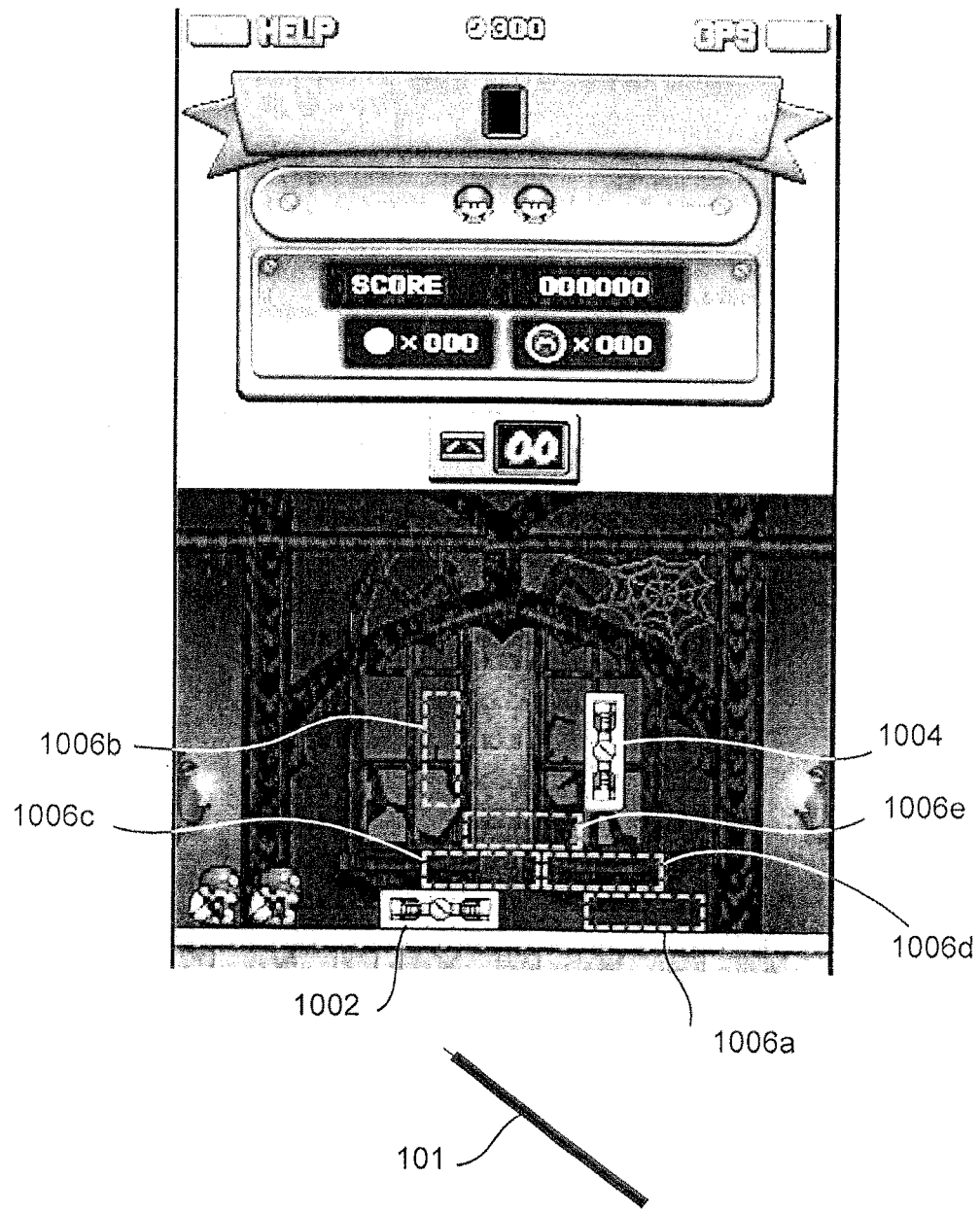
FIGS. 12-18 show an additional exemplary illustrative non-limiting implementation that uses the virtual suction tool to move objects from one predetermined item slot to another.

Exemplary Non-Touch Based Corral Type Pointing Device Virtual Suction or Sweeping Tool FIG. 11A shows an exemplary non-limiting illustrative implementation of a game controller 323 with object capture capability. This controller 323 includes a pointing capability as described in U.S. Patent Application No. 60/716,937 (723-1706) incorporated herein by reference. The controller 323 may be used as a virtual suction tool, a virtual sweeping tool, or other virtual tool with object capture capability. Controller 323 may capture objects from a display screen 325 out of reach of the player, and may show an inventory of captured objects on a mini-display 321. The objects 121, 200 are displayed on the main screen 325 and a target reticule 327 may be employed to aid in determining which object is about to be captured. The objects can be animated to move as they are displayed on the mini-display 321 to make it appear as if they are being held in a handheld corral.

FIG. 11B shows a further exemplary non-limiting illustrative implementation of a game controller 323 having captured a plurality of virtual objects 100, 200, 121, 400, 500. In this implementation, the player has captured several characters 100, 200, an enemy 121, and some items 400, 500. All of the captured items 100, 200, 121, 400, 500 are displayed on a screen 321. Any suitable display may be used to indicated stored objects.

FIG. 11B shows that the player may store and organize characters and/or items in the game without opening a separate window. Players don't have to miss the contents of the current game screen. This can be used as a convenient "transportation" or "transporter" tool for games which require managing a lot of characters and/or items.

In a further exemplary non-limiting illustrative implementation, controls may be provided on the game controller 323 and the player can play a mini-game using the captured objects. For example, the player could manipulate a character 100 to grab object 400 and attack enemy 121. The player could then have to manipulate all characters 100, 200 out through object (pipe) 500 to escape. Any number of suitable scenarios can be provided for the stored objects.

We have described technology that provides interesting user interfaces to increase the fun and excitement of videogame play. Using a pointing device to interact with a 2D or 3D graphics-based system, it is possible to simulate the behavior of a virtual directional tool capable of remove material from and/or injecting material into the 3D or other graphics environment. The use of virtual suction or vacuum provides a very intuitive virtual suction tool capability that videogame users readily understand. A simple pen-based stylus or other pointing device held in the user's hand thus appears to have the capabilities of a virtual vacuum cleaner or other virtual suction device that can remove objects, game characters, water, fog, fire or any other material from the virtual environment. The user has the feel that the virtual suction device has absorbed and now contains or has otherwise disposed of the material that has been "sucked" from the virtual environment into a real world object held in the player's hand.

In some implementations, the game or application developer may wish to create the impression that the material that has been virtually sucked from the virtual game environment has been disposed of (i.e., via an invisible virtual vacuum hose connecting the stylus to a waste receptacle). In other exemplary illustrative non-limiting implementations, the virtual suction tool may be designed by the game or other application developer to virtually contain the objects that have been sucked from the virtual environment so they be expelled back into the environment. For example, in the order in which there were initially removed. In some exemplary illustrative non-limiting implementations, the objects sucked from the virtual environment may be returned to the environment in the same form in which there were removed. In other exemplary illustrative non-limiting implementations, the virtual suction tool may transform the objects (e.g., a block may be transformed into fire, water may be transformed into ice cubes, etc.). before being reinserted into the virtual environment.

While suction is a useful and interesting effect to provide to a virtual tool, other ways the virtual tool may interact with the environment may also be provided alternatively or in addition. As one example, a virtual tool may be provided with the functionality of a virtual air compressor so that it can exhaust material into the virtual game environment. Virtual power washers, virtual flame throwers, virtual brooms or other sweeping devices, virtual eye droppers, virtual laser beams or other weapons, virtual cutting tools, or any other number of arrangements are possible.

While it is useful or advantageous to provide direct contact between the tip of a virtual tool stylus and a touch screen displaying the virtual environment the virtual tool is interacting with, other arrangements are possible. For example, as has been explained above, it is possible to use a remote pointing device aimed at a display to provide virtual tool interaction. Such virtual tool interaction may be provided with a display capability so the user may see, in a handheld device display, images of the objects and other material he or she has captured from the virtual environment.

FIGS. 12-18 show an additional exemplary illustrative non-limiting game play sequence using the virtual suction device to move objects such as pipes, springs, cannon, etc. having behaviors from one place to another in a gamescape. In the example shown in FIG. 12, the game environment provides two pipe sections 1002, 1004 and a plurality of preplaced pipe section slots 1006*a*-1006*e*. The empty slots 1006*a*-1006*e* are designated by visible dotted boxes. The pipe sections 1002, 1004 are also disposed in such slots but because the slots are occupied the dotted boxes are not visible.

Figure 13:
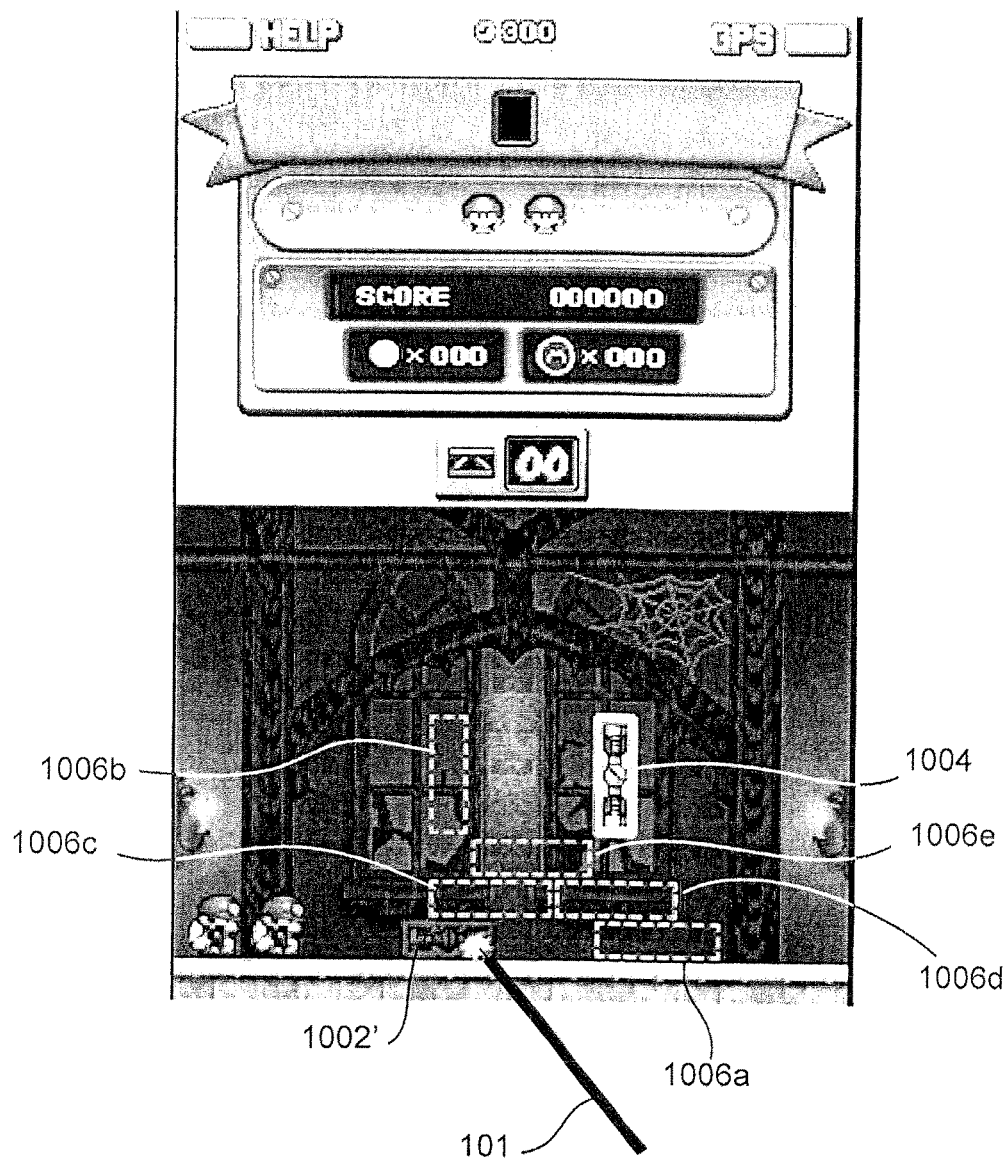
Figure 14:
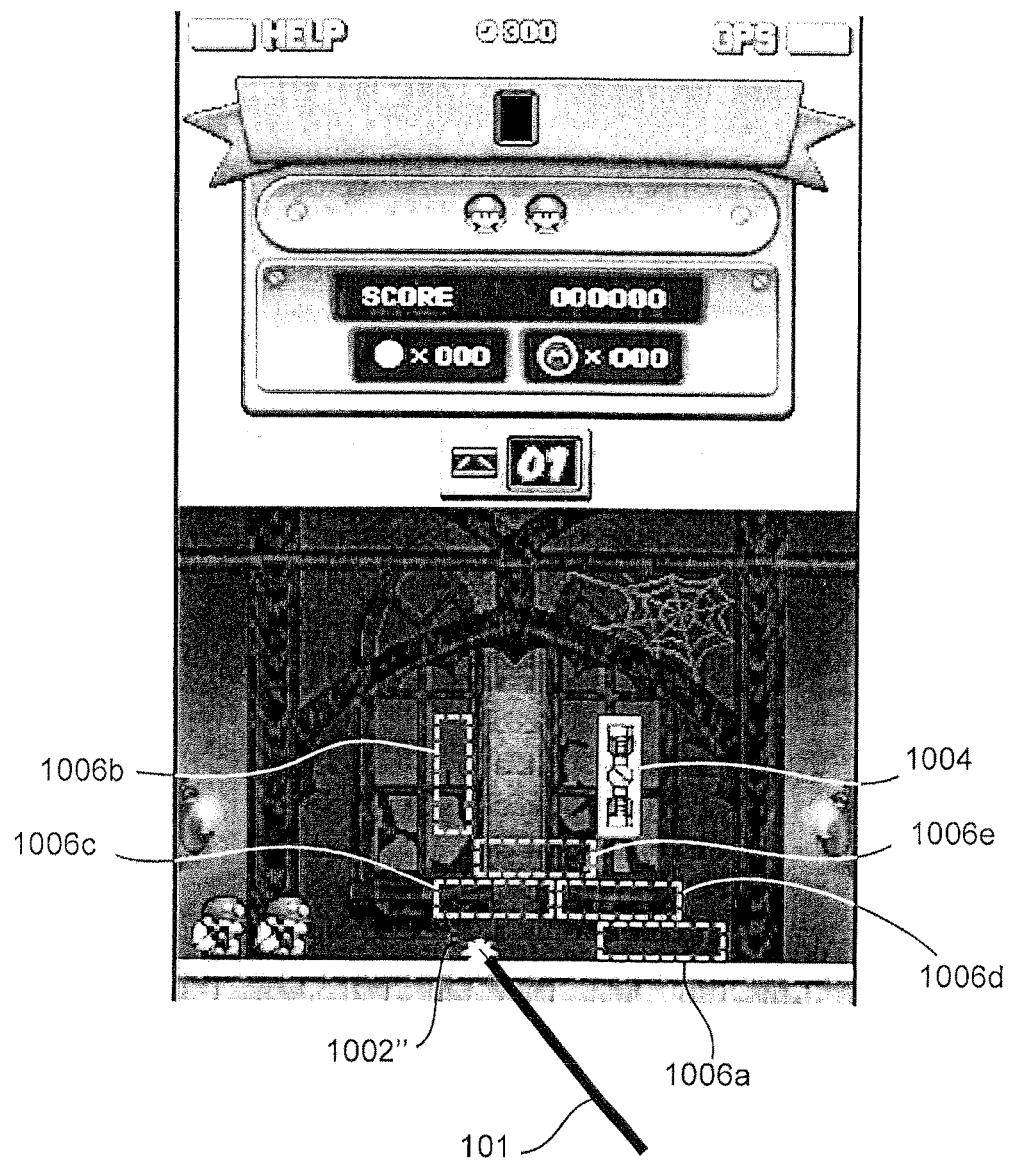
Figure 15:
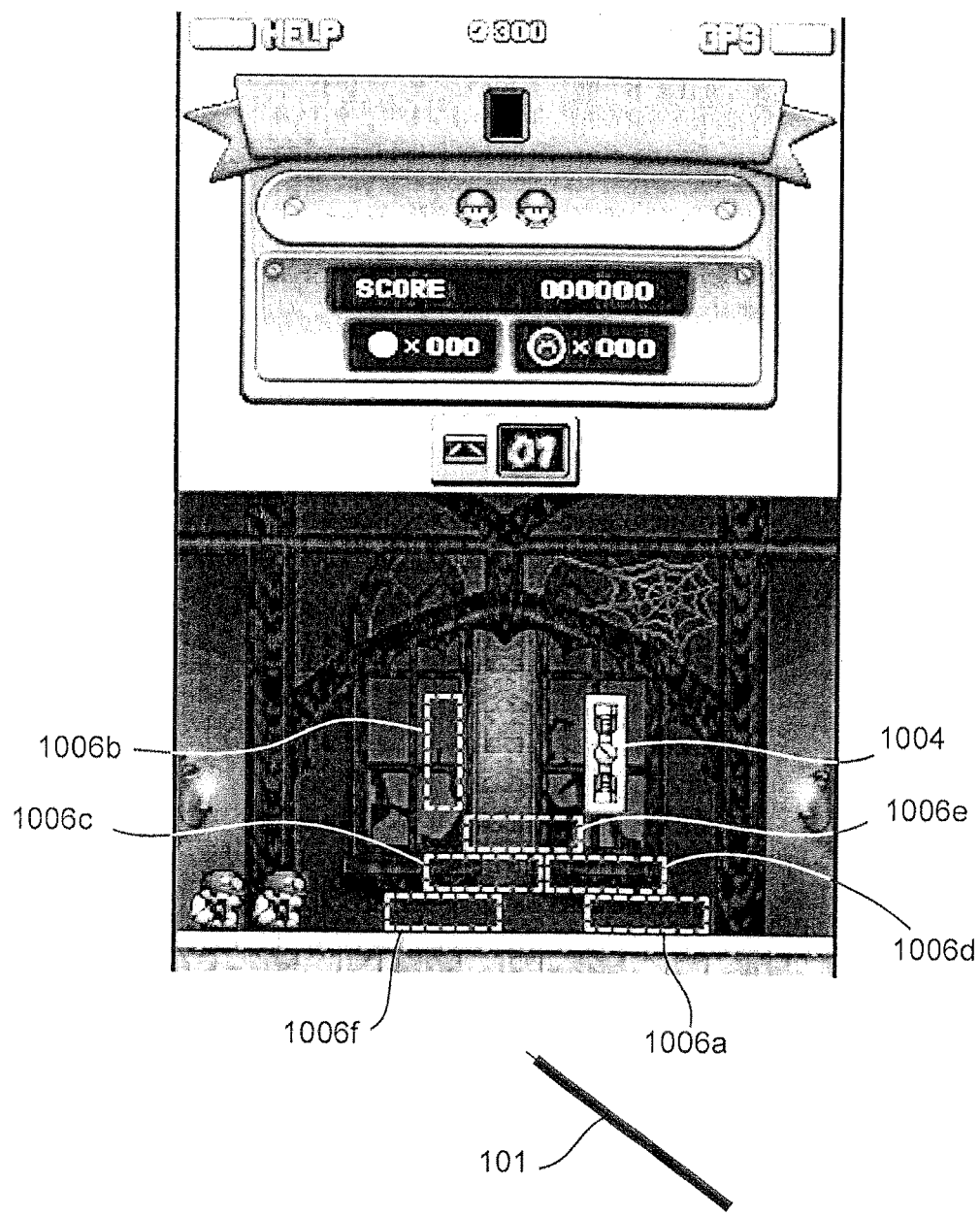

Suppose now that the user wants to move the pipe section 1002 from its current location to slot 1006*b*. The user can touch the stylus (virtual suction tool) 101 to the pipe section 1002. This action in the exemplary illustrative non-limiting implementation causes an effect such as a flame or wind indication to be displayed at the tip of stylus 101 at the point where the stylus touches the touch screen. The system then animates the pipe section 1002 to contract (as shown in FIG. 13) toward the stylus 101's tip as if the pipe section were being sucked into the stylus 101. FIG. 14 shows the pipe section 1002 as nearly completely disappeared and sucked into the stylus 101. When the pipe section 1002 has completely disappeared, it is replaced by an empty pipe slot 1006*f* and the pipe section 1006, from the user's perspective, now held within the virtual suction device 101.

Figure 16:
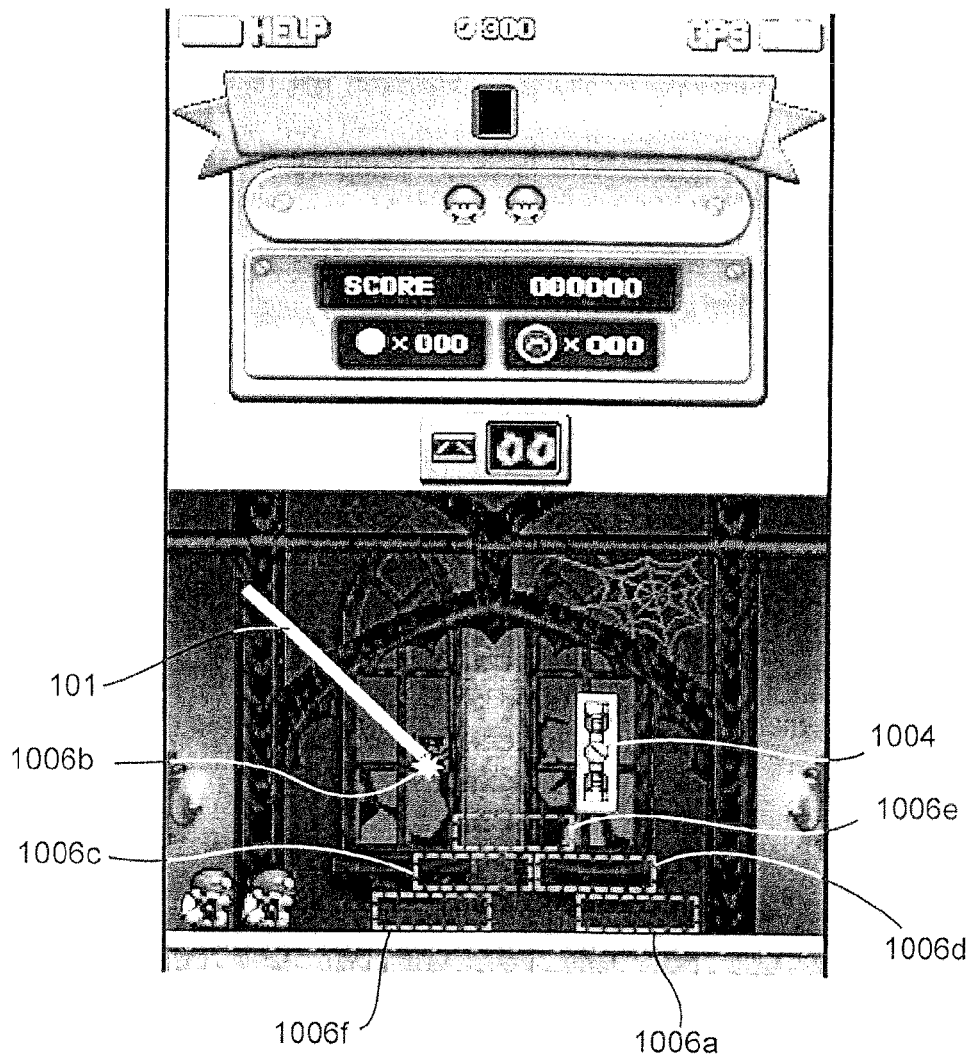
Figure 17:
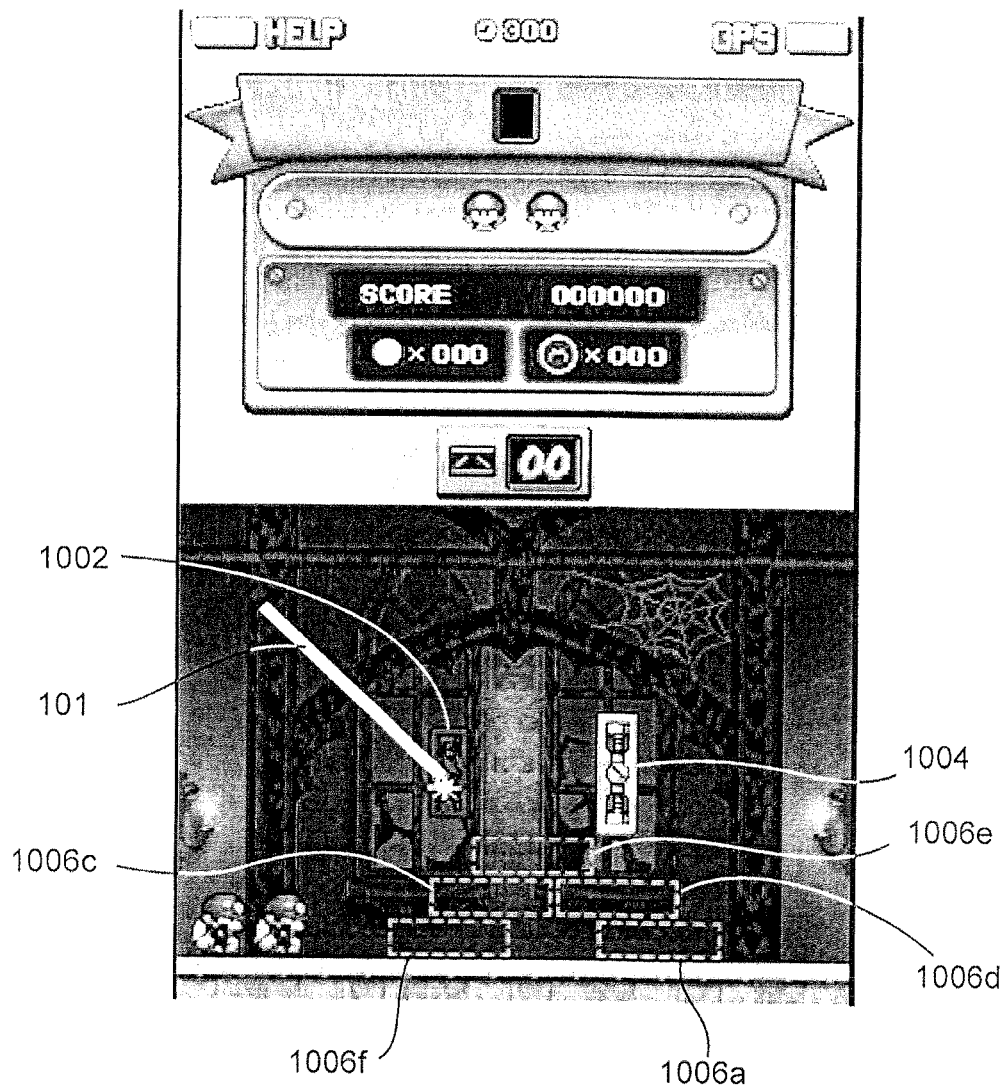
Figure 18:
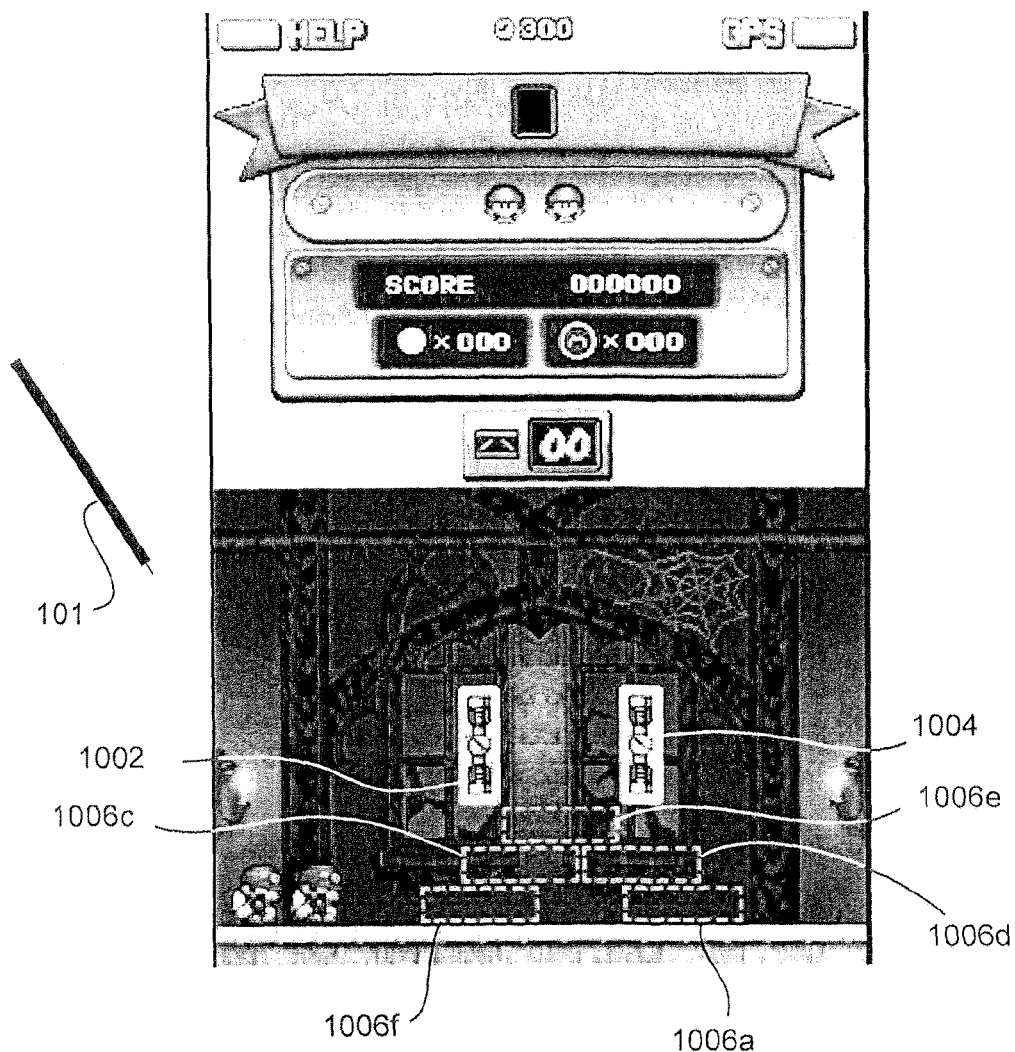

Now suppose the user touches the virtual suction device 101 tip anywhere within the destination visible dotted box 1006*b*. As shown in FIG. 16, an additional effect is displayed at the point where the virtual suction device 101 tip touches the touch screen, and (as shown in FIG. 17) the previously suctioned pipe section 1002 appears to be expelled into the destination block 1006*b*. Note however that as the pipe section 1002 is expelled into the destination block 1006*b*, it takes on both the orientation and the size of the destination block so it is now oriented vertically rather than in its original horizontal orientation. FIG. 18 shows the gamescape with transported pipe section 1002 after the virtual suction device is lifted from the touch screen.

To provide the functions above, the flowchart of FIG. 2C can be modified to include additional steps of drawing the dotted boxes or causing the dotted boxes to vanish as appropriate.

While the technology herein has been described in connection with exemplary illustrative non-limiting implementations, the invention is not to be limited by the disclosure. For example, although specific exemplary non-limiting implementations herein relate to using a stylus to simulate a virtual suction tool interacting with 3D touch-screen based video games, other implementations are possible. For example, applications outside of the gaming arena, including simulations, virtual reality and augmented reality, are possible. While 3D graphics provides advantages, other forms of graphics (e.g., 2D, holographic, television, digital television, etc.) could be used instead. Vacuum or suction tools provide interesting results, but in other implementations the virtual tool could perform the function or effect of any tool within the real world or within the imagination of the human mind. While the use of a touch screen based interface has advantages, other implementations could use non-touch screen based approaches to indicate position, interactivity, or the like. While the exemplary illustrative non-limiting implementation uses the same physical object to both interact with the computer controlling or creating the virtual 3D environment and to be provided with simulated and/or enhanced tool functionality, other approaches are possible. While the use of a stylus is useful in certain applications, other forms of physical objects (e.g., objects made to resemble the tool they are simulating) could be used instead. The actual function of the object in the real world can have a range from virtually no functionality to extensive functionality. For example, in some exemplary non-limiting implementations, the object used for interactivity could be an actual tool having extensive tool functionality, with the virtual environment providing a degree of enhancement to an existing real world tool function and/or adding a new, virtual function to a repertoire of actual real world functions. The exemplary illustrative non-limiting implementation animates certain objects being deformed as they are suctioned into the virtual vacuum tool, but in other exemplary implementations no deformation is shown and the objects are suctioned "as is" into the tool, or certain objects (e.g., those with flexible virtual characteristics) may be deformed whereas other objects (e.g., "hard" virtual objects such as stones, game characters, etc.) may change appearance in ways other than deformation (e.g., reduce in size before being suctioned so as to appear to "fit" dimensionally into the virtual suction tool tip) or not change appearance at all. The invention is intended to be defined by the claims and to cover all corresponding and equivalent arrangements whether or not specifically disclosed herein.

We claim:

1. A computer-implemented method of presenting a user interface comprising:
    causing display, by a computer, of a plurality of virtual objects;
    receiving, based on user pointing, an input indicating a pointed-to position; and
    in response to the received input, progressively removing, by the computer, the plurality of displayed objects by animated contraction of the plurality of displayed objects towards the indicated pointed-to position; and
    simultaneously virtually storing the plurality of removed displayed objects.

2. The computer-implemented method of claim 1, further comprising:
    receiving, based on the user pointing, a second input indicating a second pointed-to position; and in response to the received second input, progressively restoring, by the computer onto the display, the removed objects at the indicated second pointed-to position.

3. The computer-implemented method of claim 2, wherein the restoring includes animated expelling of the objects from the indicated second pointed-to position in a last-in-first-out sequence.

4. The computer-implemented method of claim 2, wherein the indicated second pointed-to position corresponds to a visually empty area and at least some of the objects are restored inside the visually empty area.

5. The computer-implemented method of claim 1, wherein at least some of the objects exhibit dynamic behavior.

6. The method of claim 1 wherein the computer limits the number of objects that can be simultaneously stored to simulate being full.

7. The method of claim 1 wherein the input comprises a touch input.

8. The method of claim 1 wherein the input comprises a non-touch input.

9. The method of claim 1 wherein progressively removing simulates suction.

10. A system for presenting a user interface comprising:
a processor in communication with a display, the processor configured to:
receive, based on user pointing, an input indicating a pointed-to position on the display; and
in response to the received input, progressively remove a plurality of displayed objects by animated contraction of the objects towards the indicated pointed-to position; and
simultaneously virtually store the plurality of removed displayed objects.

11. The system of claim 10, wherein the processor is further configured to:
receive, based on the user pointing, a second input indicating a second pointed-to position; and
in response to the received second input, progressively restoring the plurality of removed objects onto the display at the indicated second pointed-to position.

12. The system of claim 11, wherein the restoring includes animated expelling of the plurality of objects from the indicated second pointed-to position in a last-in-first-out sequence.

13. The system of claim 11, wherein the indicated second pointed-to position corresponds to a visually empty area and at least some of the plurality of objects are restored inside the visually empty area.

14. The system of claim 10, wherein the objects exhibits dynamic behavior.

15. A non-transitory storage medium for presenting a user interface, the medium storing information comprising:
first instructions for displaying, by a computer, a plurality of virtual objects;
second instructions for receiving, based on user pointing, an input indicating a pointed-to position; and
third instructions for, in response to the received input, progressively removing, by the computer, the plurality of displayed objects by animated contraction of the objects towards the indicated pointed-to position to thereby simulate simultaneous storage of the plurality of removed objects.

16. The non-transitory storage medium of claim 15, said medium further storing information comprising:
fourth instructions for receiving, based on the user pointing, a second input indicating a second pointed-to position; and
fifth instructions for, in response to the received second input, progressively restoring, by the computer in a last-in-first-out order, the plurality of removed objects at the indicated second pointed-to position.

17. The non-transitory storage medium of claim 16, wherein the restoring includes animation expelling of the objects from the location corresponding to the indicated second pointed-to position.

18. The non-transitory storage medium of claim 16, wherein the indicated second pointed-to position corresponds to a visually empty area and at least some of the objects are restored inside the visually empty area.

19. The non-transitory storage medium of claim 15, wherein the objects exhibit dynamic behavior.

20. A computer-implemented method of presenting a user interface comprising:
displaying, by a computer, a virtual space;
receiving, based on user pointing, an input indicating a pointed-to position; and
in response to the received input, progressively injecting, by the computer, a plurality of simultaneously virtually stored objects into the virtual space at the indicated pointed-to position.

21. The method of claim 20, wherein the indicated pointed-to position corresponds to a visually empty area in the virtual space and at least some of the objects are injected inside the visually empty area.

22. The method of claim 20, wherein the objects exhibit dynamic behavior.

23. A system for presenting a user interface comprising:
a display for displaying a virtual space;
a processor connected to the display, the processor configured to:
receive, based on user pointing, an input indicating a pointed-to position; and
in response to the received input, progressively injecting a plurality of simultaneously virtually stored objects into the virtual space at the indicated pointed-to position.

24. The system of claim 23, wherein the indicated pointed-to position corresponds to a visually empty area in the virtual space and at least some of the objects are injected inside the visually empty area.

25. The system of claim 23, wherein the injecting includes animated expelling of the plurality of objects from the indicated pointed-to position.

26. The system of claim 23, wherein the objects exhibit dynamic behavior.

27. A non-transitory storage medium for presenting a user interface, the medium storing information comprising:
first instructions for displaying, by a computer, a virtual space;
second instructions for receiving, based on user pointing, an input indicating a pointed-to position; and
third instructions for, in response to the received input, progressively injecting, by the computer, a plurality of simultaneously virtually stored objects into the virtual space at the indicated pointed-to position.

* * * * *